United States Patent [19]
Oliver

[11] 3,733,601
[45] May 15, 1973

[54] DIGITAL READOUT SYSTEM FOR ANALYTICAL MEASURING INSTRUMENTS

[75] Inventor: Donald L. Oliver, Austin, Tex.

[73] Assignee: Infotronics Corporation, Houston, Tex.

[22] Filed: May 20, 1969

[21] Appl. No.: 826,096

[52] U.S. Cl........340/347 AD, 235/92 PB, 324/77 A, 324/103 R, 340/15.5 AP
[51] Int. Cl..............................................H03k 13/02
[58] Field of Search..................340/347, 15.5, 146.2; 235/154, 155, 168, 177, 92 PB, 92 PC; 324/77 A, 103

[56] References Cited

UNITED STATES PATENTS

| | | |
|---|---|---|
| 3,185,820 | 5/1965 | Williams et al. ..................235/92 PB |
| 3,201,781 | 8/1965 | Holland ..........................340/347 AD |
| 3,412,330 | 11/1968 | Klaver..................................324/103 |
| 3,491,294 | 1/1970 | Little et al. ........................324/77 A |
| 3,541,311 | 11/1970 | Taylor...............................235/92 PC |
| 3,304,497 | 2/1967 | MacRitchie et al. ................324/120 |
| 3,412,241 | 11/1968 | Spence et al. .........................235/183 |
| 3,471,853 | 10/1969 | Brooks et al. .........................340/347 |

*Primary Examiner*—Maynard R. Wilbur
*Assistant Examiner*—Leo H. Boudreau
*Attorney*—Jack W. Hayden

[57] ABSTRACT

A digital readout system for use with analytical measuring instruments, such as mass spectrometers, which produce a fluctuating analog measurement signal in response to a varying control effect. The system includes a pair of digitizer channels, one for detecting and digitizing the maximum values of peaks in the analog measurement signal and the other for processing and digitizing signals which identify these maximum values in terms of a parameter related to the magnitude of the varying control effect. As applied to a mass spectrometer, the maximum value or peak height measurement is accomplished by utilizing a voltage-to-frequency converter to produce a pulse train having a frequency or repetition rate directly proportional to the amplitude of the spectrometer ion current signal. The output of the converter is fed to digital logic circuitry wherein it is periodically sampled and analyzed. In particular, the value of each sample is compared with the last sample that was stored in a memory circuit and the logic circuitry automatically makes decisions as to whether the sample in the memory circuit should be retained, replaced by the new value or read out. In a peak sensing mode, the stored sample is replaced by the new value if the new value is larger. The most recent sample stored in the memory circuit is read out whenever a new sample is a given percentage less than the stored value and the logic circuitry is then switched to a valley sensing mode. In this latter mode, the sample value stored in the memory circuit is replaced by a new value if the new value is smaller than the stored value. When the sample value rises above the most recent stored value by a given percentage, the logic circuitry is switched back to the peak sensing mode, whereupon the logic circuitry starts looking for the maximum value of a new peak.

The second digitizer channel or peak identification channel is provided with six selectable operating modes for enabling selection of a digital readout that is related to one or more of three parameters. These parameters are the spectrometer accelerating voltage, the spectrometer magnetic field intensity and the elapsed time of the control effect variation. In all cases, the value that was present when the maximum value of a peak occurred will be read out. The first two operating modes enable either the accelerating voltage or the magnetic field intensity to be read out directly. The next three modes utilize computing circuits for computing and reading out mass number values as determined from either the accelerating voltage or the magnetic field intensity or both. The sixth mode provides an elapsed time readout expressed in terms of the number of sample intervals that have occurred.

21 Claims, 7 Drawing Figures

Patented May 15, 1973

Fig. 2A      SPECTROMETER ION CURRENT OUTPUT

Fig. 2B      SAMPLING PULSES (EXPANDED SCALE)

Donald L. Oliver
INVENTOR

BY
Hayden Pravel Wilson & Matthews
ATTORNEYS

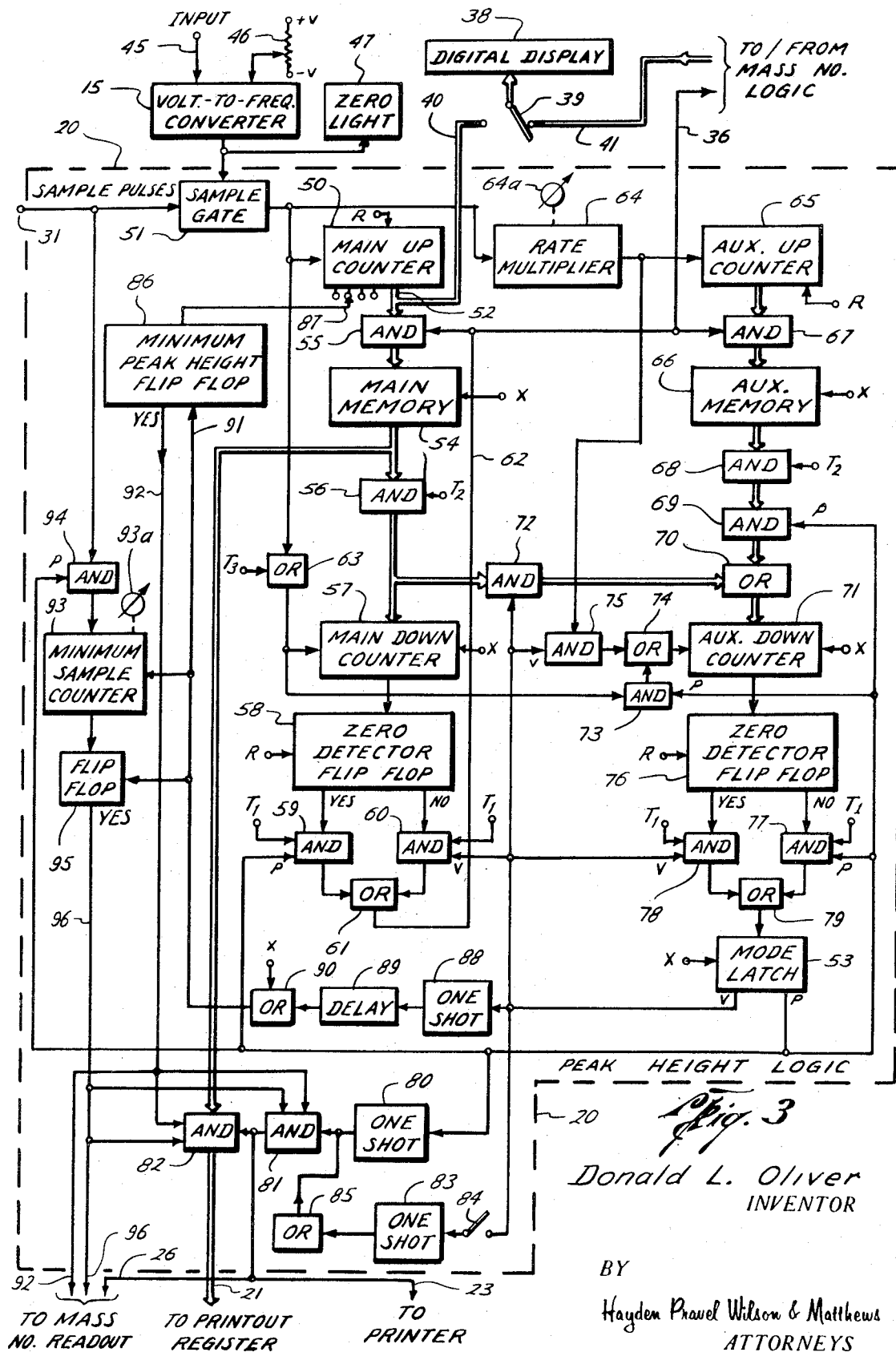

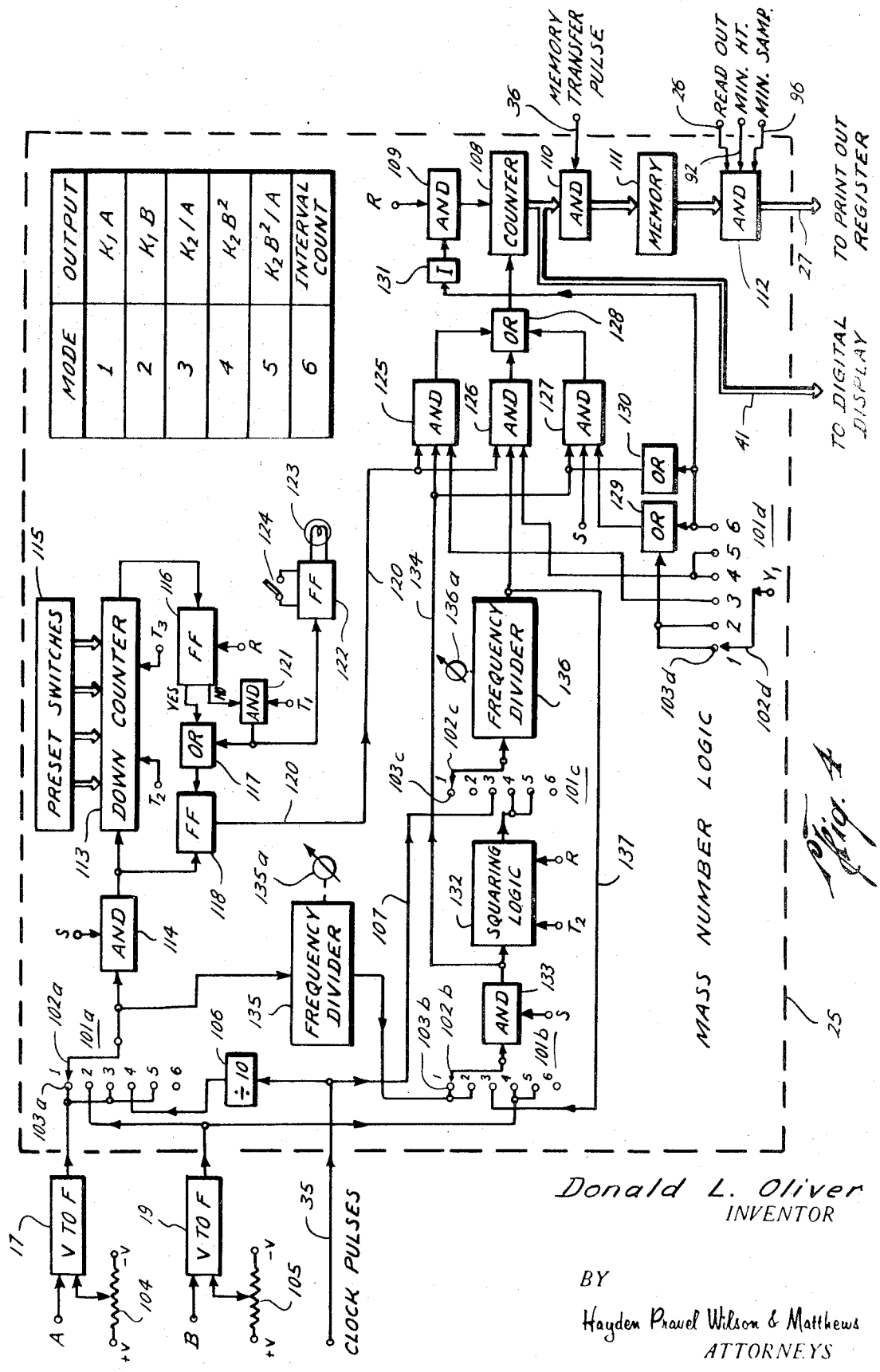

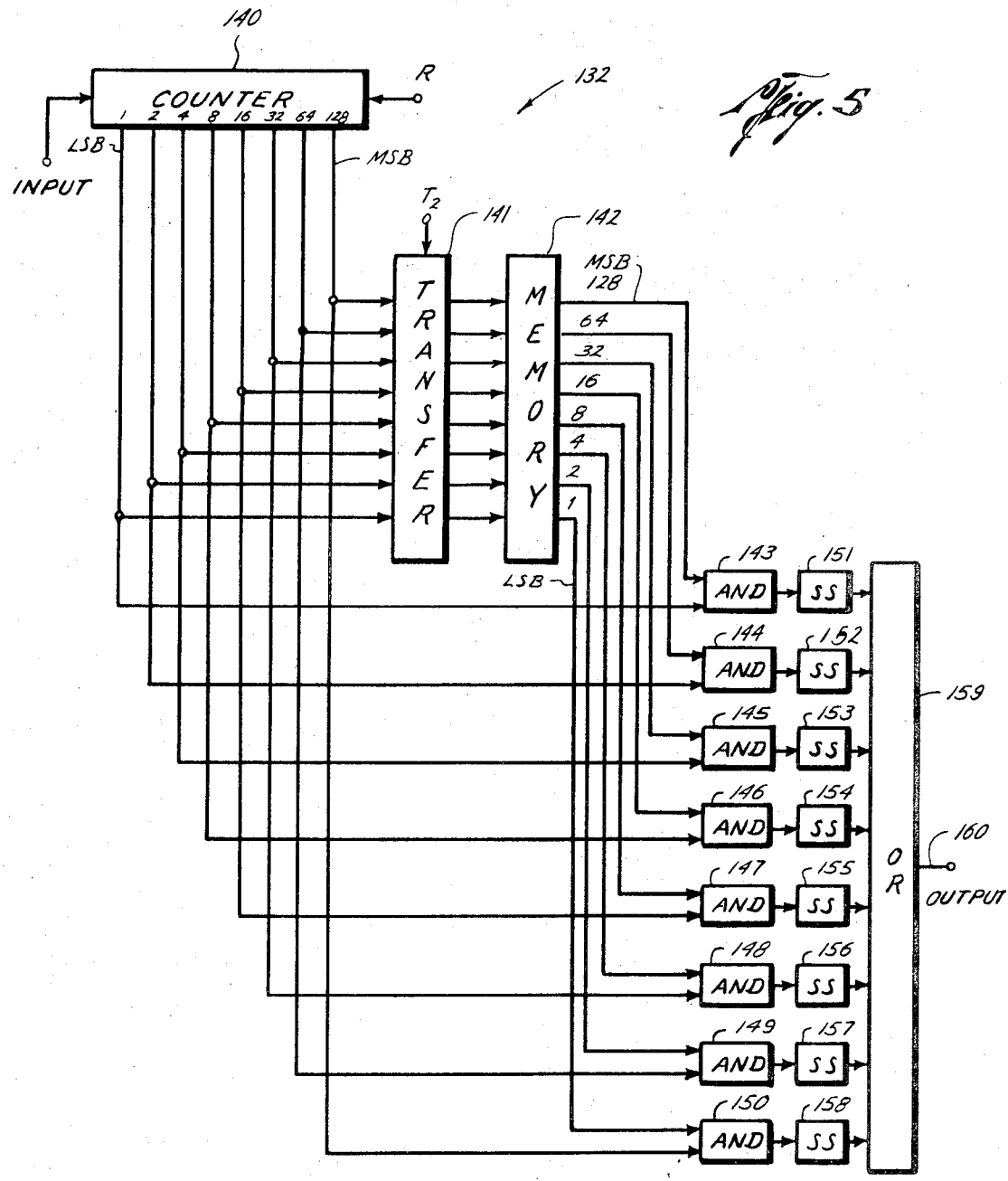

DIGITAL READOUT SYSTEM FOR ANALYTICAL MEASURING INSTRUMENTS

BACKGROUND OF THE INVENTION

This invention relates to a digital readout system for use with analytical measuring instruments, such as mass spectrometers and the like, which produce a fluctuating analog measurement signal in response to a varying control effect.

In a mass spectrometer, for example, a sample to be analyzed is ionized and the resulting positive ions are subjected first to an accelerating voltage and then to a magnetic deflection field. If the accelerating voltage and magnetic field intensity are of the proper values, then ions of a particular mass number (number of protons and neutrons in nucleus) are caused to pass through a narrow exit slit suitably located relative to the point at which the ions enter the magnetic field. The intensity or magnitude of the ion current through the exit slit is proportional to the quantity of the element or isotope of that particular mass number which is present in the sample being analyzed.

By varying either the accelerating voltage or the magnetic field intensity or both as a function of time, ions of different mass numbers are caused to pass through the exit slit at different times. If the resulting ion current signal is recorded as a function of the varied parameter or of time, then the identity and the relative proportions of the different elements or isotopes contained in the sample can be determined from such record. The mass number values at which occur the ion current peaks identify the elements or isotopes present, while the relative heights of the peaks indicate the relative amounts of these elements or isotopes. The mass number values are determined from the accelerating voltage and magnetic field intensity values at the different times.

The obtaining of the desired peak height and mass number values from records of this type is tedious and time consuming, especially where it is necessary to analyze the records obtained from many different samples. Such analysis requires a manual scaling of the peak heights and repeated computations of the mass numbers. Consequently, it would be highly desirable to have an automatic readout system which would enable the automatic print-out of readable numbers representing the peak heights and mass numbers for the spectrometer ion current peaks.

There have been various earlier proposals for detecting and digitizing the peak heights of the peaks in a spectrometer ion current signal. Some of these proposals have involved the use of differentiators for detecting the maximum peak value, together with the use of a capacitor for holding the peak value while it is digitized. Others have involved the use of feedback type analog-to-digital converters for more or less continuously tracking the ion current signal, together with means responsive to the difference between the incoming and feedback signals for detecting the occurrence of a peak and reading out the current digital value. These prior proposals, however, suffered from various disadvantages. Some were too slow acting, some were too inaccurate, some were too sensitive to spurious noise peaks and some were too expensive. Also, while some provided for a digital readout of the accelerating voltage values, none provided for a simultaneous computation and automatic readout of the ultimate mass number values. Further, none were capable of accommodating the case where the magnetic field intensity and not the accelerating voltage is varied.

SUMMARY OF THE INVENTION

It is an object of the invention, therefore, to provide a new and improved digital readout system for use with analytical measuring instruments for producing digital output signals representing numbers proportional to the maximum values of peaks in the measurement signal.

It is another object of the invention to provide a new and improved digital readout system which is also capable of producing, during the same analysis, digital output signals representing numbers proportional to the minimum values of the valleys in a fluctuating measurement signal.

It is a further object of the invention to provide a new and improved digital readout system for use with an analytical measuring instrument which produces a fluctuating measurement signal in response to a varying control effect for simultaneously producing digital output signals for the measurement signal value, and the control effect value occurring at the instant of occurrence of the maximum value of a peak in the measurement signal.

It is an additional object of the invention to provide a new and improved digital readout system for use with a mass spectrometer for producing digital output signals for the ion current value and the mass number value occurring at the instant of occurrence of the maximum value of a peak in the ion current signal.

It is another object of the invention to provide a new and improved digital readout system for use with mass spectrometers for providing automatic computation of mass number values.

It is a further object of the invention to provide a new and improved digital readout system for use with mass spectrometers and having a peak identification readout channel capable of responding to one or more of the accelerating voltage, the magnetic field intensity or the elapsed time.

It is an additional object of the invention to provide a new and improved digital readout system for use with mass spectrometers and having means for adjusting the timing of the readout operations for accommodating different scanning rates for the accelerating voltage or the magnetic field intensity.

It is another object of the invention to provide a new and improved digital readout system for use with mass spectrometers and the like and having improved noise immunity.

It is a further object of the invention to provide a new and improved digital readout system for use with mass spectrometers and the like and having means for suppressing the readout of values for peak fluctuations having less than a selected minimum height.

It is an additional object of the invention to provide a new and improved digital readout system for use with mass spectrometers and the like and having means for suppressing the readout of values for peak fluctuations having less than a selected minimum duration.

In accordance with one feature of the invention, there is provided a digital readout system for use with an analytical measuring instrument which produces a fluctuating measurement signal. The readout system includes converter circuit means responsive to the measurement signal for producing a repetitive signal having a repetition rate dependent on the amplitude of the measurement signal. The system also includes counting circuit means responsive to the repetitive signal during periodic sampling intervals for developing digital signals dependent on the amplitude values of the measurement signal during the successive sampling intervals. The system further includes extreme value sensing circuit means responsive to the repetitive signal for transferring selected ones of the digital signals to output terminal means for the readout system.

In accordance with another feature of the invention, the readout system is for use with an analytical measuring instrument which also produces a control effect signal representing the magnitude of a varying control effect to which the sample being analyzed is subjected. In this case, the readout system further includes second converter circuit means responsive to the control effect signal for producing a second repetitive signal having a repetition rate dependent on the amplitude of the control effect signal. This system also includes circuit means responsive to the second repetitive signal during the sampling intervals for developing second digital signals dependent on the amplitude values of the control effect signal during the successive sampling intervals. In this system, the extreme value sensing circuit means also operates to transfer selected ones of the second digital signals to the output terminal means for the readout system.

For a better understanding of the present invention, together with other and further objects and features thereof, reference is had to the following description taken in connection with the accompanying drawings, the scope of the invention being pointed out in the appended claims.

BRIEF DESCRIPTION OF THE DRAWINGS

Referring to the drawings:

FIGS. 2A, 2B and 2C are signal waveform diagrams used in explaining the operation of the FIG. 1 system;

FIG. 3 is a more detailed block diagram of the peak height logic portion of the FIG. 1 system;

FIG. 4 is a more detailed block diagram of the mass number logic portion of the FIG. 1 system; and FIG. 5 is a detailed block diagram of a squaring logic unit used in the FIG. 4 mass number logic.

DESCRIPTION OF THE PREFERRED EMBODIMENT

Figure 1:
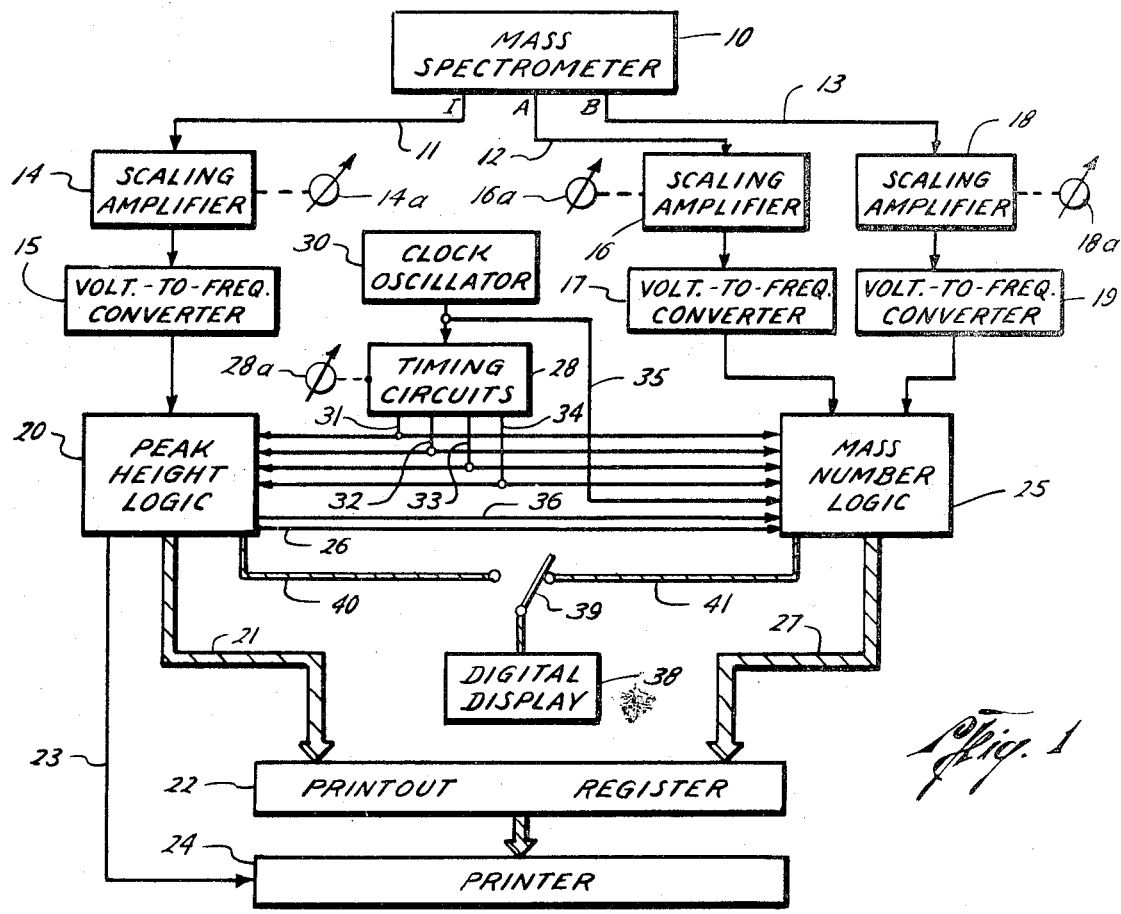
FIG. 1 is an overall block diagram of a representative embodiment of a digital readout system constructed in accordance with the present invention.

Referring to FIG. 1, the digital readout system will be described for the case where it is used with a mass spectrometer type of analytical measuring instrument. A mass spectrometer instrument is indicated at 10. It produces three separate output signals. A first of these is an ion current signal (I) which is provided on output line 11. It is an analog type measurement signal having recurrent data fluctuations which extend upwardly from a base line value. These data fluctuations or data peaks occur when the different elements or isotopes in the sample being analyzed are cause to pass through the exit slit in the spectrometer 10. A second of the signals provided by the mass spectrometer 10 is an accelerating voltage signal (A) appearing on output line 12. This is an analog signal which is directly proportional to the accelerating voltage used within the spectrometer 10. If the accelerating voltage is the control effect parameter which is varied, then the accelerating voltage signal on line 12 is a time varying signal which varies between a maximum value and a minimum value or vice versa over a time interval of anywhere from several seconds to several minutes or more. The third output signal provided by the mass spectrometer 10 is a magnetic field intensity signal (B) which appears on output line 13. This is an analog signal which is directly proportional to the intensity of the magnetic deflection field used in the mass spectrometer 10. If the magnetic field intensity is the control effect parameter which is varied, then this signal is a time varying signal which varies between a maximum value and a minimum value or vice versa over a time interval of anywhere from several seconds to several minutes or more.

It is noted that commercial types of mass spectrometers may not provide a magnetic field intensity signal. As will be seen, the present digital readout system is sufficiently flexible that it will operate properly even though a magnetic field intensity signal is not provided.

As is known, the relationship between the mass number or nominal atomic weight of an element of isotope and the accelerating voltage and magnetic field intensity values is a mass spectrometer can be described by the following expression:

$$M = KB^2/A$$

where:
M= mass number (number of protons and neutrons in each nucleus),
K= proportionality constant,
A= magnitude of the accelerating voltage,
B= intensity of the magnetic field.

The three analog signals appearing on lines 11, 12 and 13 are supplied to the digital readout system proper. In particular, the ion current signal on line 11 is supplied by way of a scaling amplifier 14 to a voltage-to-frequency converter 15. The accelerating voltage signal appearing on line 12 is supplied by way of a scaling amplifier 16 to a voltage-to-frequency converter 17. The magnetic field intensity signal appearing on line 13 is supplied by way of a scaling amplifier 18 to a voltage-to-frequency converter 19. Scaling amplifiers 14, 16 and 18 are used to help provide the desired full scale values for the system. Adjustment of these full scale values is accomplished by means of control knobs 14a, 16a and 18a which operate to vary the signal gain factors of the respective ones of the amplifiers 14, 16 and 18. Voltage-to-frequency converters 15, 17 and 19 are responsive to the signals supplied to the inputs thereof for producing at their outputs repetitive signals having repetition rates dependent on the amplitudes of the respective input signals. For the present example, it will be assumed that each of these repetitive signals is in the form of a train of pulses whose instantaneous recurrence frequency or repetition rate is directly proportional to the instantaneous amplitude of the corresponding converter input signal. Converters 15, 17 and 19 may, for example, provide output pulses having repetition rates which can vary over a zero to 5 megahertz range.

The repetitive pulses produced by the converter 15 are supplied to peak height logic circuitry 20. This peak height logic 20 operates to count the numbers of these ion current repetitive pulses occurring during periodic sampling intervals, to analyze the successive count values obtained in this manner and to produce output digital signals representing the maximum values of the data peaks in the ion current signal. If desired, the logic 20 will also provide intervening digital output signals representing the minimum values of the valleys intermediate the peaks in the ion current signal. These output signals are in a binary coded decimal form representing six-digit decimal numbers. These output signals are supplied by way of a twenty-four line cable 21 to a printout register 22. The peak height logic 20 also provides a print command signal over a ling 23 to a printer 24 which is connected to the output of the printout register 22. control effect The repetitive pulses derived from the accelerating voltage signal and the magnetic field intensity signal and appearing at the outputs of converters 17 and 19 are supplied to mass number logic circuitry 25. Logic 25 includes various selectable operating modes. In an illustrative one of these modes, the logic 25 samples the accelerating voltage and field intensity repetitive pulses during the same sampling intervals as for the peak height logic 20 and computes for each such sampling interval the mass number value at that instant. When the maximum value of a peak in the ion current signal is detected by the peak height logic 20, a readout command signal is detected generated therein and is supplied by way of a line 26 to the mass number logic 25. This readout command signal causes the mass number logic 25 to provide at the output thereof a digital signal representing the mass number value which was computed at the instant of occurrence of the maximum value in the ion current peak. This digital output signal from logic 25 is of a binary coded decimal form representing a decimal number having five digits. It is supplied by way of a twenty line cable 27 to the printout register 22.

Shortly following the occurrence of a print command signal on the line 23, the printer 24 is caused to print the numerical values for the two digital signals contained in the printout register 22. There is thus printed in a side-by-side manner on a suitable paper tape a six digit number representing the peak height value and a five digit number representing the corresponding mass number value. This printout is repeated each time the peak height logic 20 detects the occurrence of a new peak in the ion current signal.

The timing of the various operations within the peak height logic 20 and the mass number logic 25 is controlled by timing circuits 28 which are driven by a clock oscillator 30. Clock oscillator 30 operates at a frequency of, for example, 10 megahertz. It produces a continuous train of clock pulses at a constant 10 megahertz rate. These clock pulses drive the timing circuits 28 to cause such circuits to produce on an output line 31 periodic sampling pulses separated by intermediate timing intervals. This portion of the timing circuits 28 is provided with a multiple-position selector knob 28a for selecting different time durations for the samplng pulses. Timing circuits 28 also produce on output lines 32, 33 and 34 various short duration transfer and reset pulses, which pulses are produced during the timing intervals intermediate the sampling pulses. The clock pulses from the oscillator 30 are also supplied directly to the mass number logic 25 by way of line 35. A further transfer pulse is generated within the peak height logic 20 and supplied to the mass number logic 25 by way of a line 36. As will be seen, this is a "transfer to memory" pulse.

The digital readout system is also provided with a digital readout display 38. This display 38 can be connected to the peak height logic 20 by means of a switching mechanism symbolically represented at 39 and a cable 40 for purposes of displaying the pulse numbers being detected in the peak height logic 20 during the successive sampling intervals. Alternatively, the digital display 38 can be connected by way of the switch mechanism 39 and a second cable 41 to the mass number logic 25 for purposes of displaying the mass number values being produced during the successive sampling intervals.

Referring now to FIG. 2A, there is shown a portion of a typical ion current signal I. FIG. 2A is a plot of the signal amplitude (vertical axis) versus time (horizontal axis). Curve I shows a pair of data peaks 42 and 43 separated by a valley region indicated at 44. A primary purpose of the peak height logic 20 is to measure the maximum values of the data peaks 42 and 43. As will be seen, the peak height logic 20 is provided with two different operating modes, namely, a peak sensing operating mode and a valley sensing operating mode. In terms of the signal waveform of FIG. 2A, the peak height logic 20 operates in the peak sensing mode during the cross-hatched intervals in FIG. 2A, such intervals being designated by the symbol P. Intermediate these peak sensing modes P, the peak height logic 20 operates in a valley sensing mode indicated in FIG. 2A by the symbol V. Initially, the peak height logic 20 starts in the peak sensing mode and remains in this mode until it verifies the occurrence of the maximum value of a data peak. It then switches to the valley sensing mode and remains in such mode until the beginning of the next data peak, whereupon it switches back to the peak mode. This process is then repeated for the next peak and the subsequent peaks occurring thereafter.

FIG. 2B shows the waveform for the periodic sampling pulses developed by the timing circuits 28. The time scale (horizontal axis) in FIG. 2B is considerably expanded relative to the time scale in FIG. 2A. In FIG. 2B, the symbol "S" is used to identify the periodic sampling pulses. These sampling pulses S are separated by intermediate timing intervals denoted by the symbol "C." The sampling pulses S are of the same duration but, by adjustment of the selector knob 28a associated with timing circuits 28, the duration of these sampling pulses S may be set to any one of a series of different values ranging, for example, from 1.25 up to 160 milliseconds. The intermediate timing intervals C are of a fixed duration, such as for example six microseconds and this same time duration is used for the intermediate timing intervals C regardless of the duration selected for the sampling pulses S. The duration selected for the sampling pulses S will depend among other things, on the rate at which the accelerating voltage or magnetic field intensity is being varied and on the number of samples it is desired to make for each data peak. Typically, it will be desired to provide somewhere on the order of twenty sampling pulses per data peak, though a greater or lesser number can be used if so desired by the operator. For sake of an example, it can be assumed that each of the sampling pulses S of FIG. 2B has a duration of 20 milliseconds.

Figure 2C:
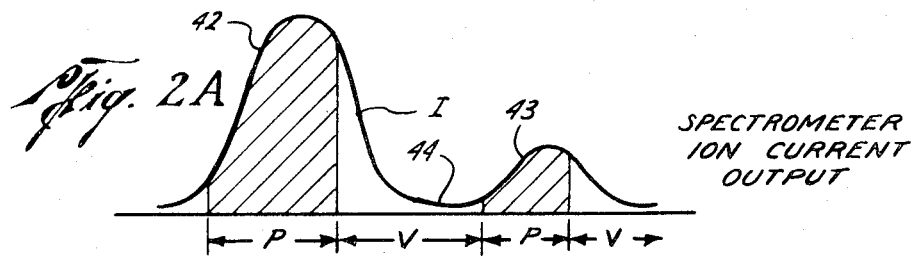
Figure 2C:
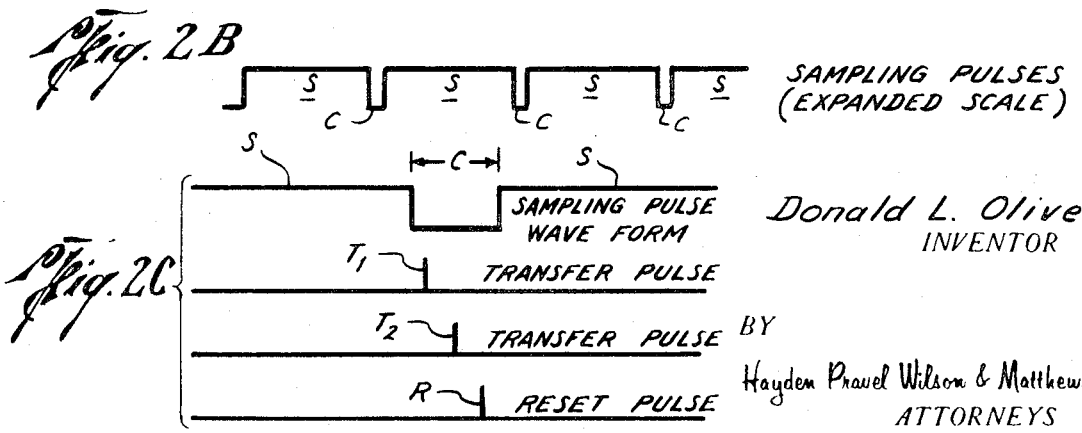

FIG. 2C shows one of the intermediate timing intervals C to an expanded time scale relative to FIG. 2B. FIG. 2C also shows typical transfer pulses $T_1$ and $T_2$ and a typical reset pulse R, all of which pulses are produced at spaced apart points during the intermediate sampling interval C. These transfer and reset pulses appear on the output lines 32–34, respectively, of the timing circuits 28. These transfer and reset pulses are repetitive in character in that they occur during each of the successive intermediate timing intervals C.

Referring now to FIG. 3, there is shown the details of the peak height logic 20. For purposes of correlation with FIG. 1, the voltage-to-frequency converter 15 and the digital display 38 are also shown in FIG. 3. The amplified ion current signal from the scaling amplifier 14 is supplied to the input of the voltage-to-frequency converter 15 by way of line 45. Means for adjusting the zero setting of the voltage-to-frequency converter 15 is provided by adjustable bias voltage source represented by a potentiometer 46 which is connected between +V and −V direct-current voltage supply terminals. In the input circuit of the converter 15, the bias voltage from the potentiometer 46 is, in effect, combined with the ion current signal for purposes of setting the base line value of the signal to a desired value near the zero level. The proper adjustment of the potentiometer 46 is indicated by means of a zero indicator light 47 which is connected to the output of the converter 15. Proper adjustment is indicated when the zero light 47 gives a low flash rate (for example, four to five flashes per second) for a minimum value of ion current input signal.

As previously indicated, the converter 15 produces a train of output pulses having a repetition rate which varied in proportion to the variation of the amplitude of the ion current input signal.

As previously indicated, the converter 15 produces a train of output pulses having a repetition rate which varies in proportion to the variation of the amplitude of the ion current signal supplied on the converter input line 45. These ion current repetitive pulses from converter 15 are supplied to the peak height logic 20 and, in particular, to a counting circuit which is responsive thereto for developing digital signals representing numbers proportional to the amplitude values of the ion current signal during the successive sampling intervals. This counting circuit is represented by a main up counter 50. Counter 50 counts in the forward or upward direction and takes the form of, for example, a six-decade decimal counter.

In order to provide the desired gating or sampling action, the peak logic 20 is provided with gating circuit means, represented by a sample gate circuit 51, which is responsive to the periodic sampling signals or sampling pulses S supplied thereto by way of the line 31 for passing the ion current repetitive pulses from the converter circuit 15 to the counting input of the counter 50 only during the occurrence of these sampling pulses S. During the intermediate timing intervals C, the main up counter 50 is reset to zero by the reset pulses R. As a consequence, there appears on the multiple-line output cable 52 of the counter 50 a continuous succession of digital signals representing the numbers of repetitive pulses counted during the successive sampling intervals. These digital signals are displayed by the digital display 38, provided the switch mechanism 39 is set to the cable 40 position.

The peak height logic 20 further includes extreme value sensing circuit means responsive to the repetitive pulses produced by the converter 15 for transferring selected ones of the digital signals produced by the counter 50 to the output terminal means for the readout system, this output terminal means being represented, for example, by the printout register 22 shown in FIG. 1. This extreme value sensing circuit means includes most of the remainder of the units shown in FIG. 3. In particular, it includes mode control circuit means, represented by a mode latch circuit 53, for establishing peak sensing and valley sensing operating modes for the peak height logic 20. Mode latch 53 is a bistable circuit and can take the form of a flip-flop circuit. It includes a pair of output lines upon which appear, during the respective operating modes, peak mode and valley mode control signals. In particular, the output line labelled as P is at a binary one level during the peak sensing mode and is at a binary zero level during the valley sensing mode. Conversely, the output line labelled as V is at a binary one level during the valley sensing mode and is at a binary zero level during the peak sensing mode. In each case, the binary one level represents the control signal. The mode latch 53 can be reset to the peak mode by application of an external reset pulse to the external reset terminal labelled as X. An external reset pulse is produced by the manual depression of a reset button on the front panel of the apparatus. Such reset pulse is used to initially set the mode latch 53 to the peak mode just prior to the commencement of an analysis run.

The extreme value sensing circuit means also includes first memory circuit means, represented by a main memory 54, for storing the most recent digital signal transferred thereto from the main counter 50. Main memory 54 is a one-word storage register for storing the binary values representing a single multi-digit number. It may be, for example, a six-decade binary code decimal type of register. Main memory 54 can be reset by an external reset pulse applied at X. Located intermediate the main up counter 50 and the main memory 54 is first transfer circuit means, represented by an AND circuit 55, for transferring a digital signal from the main up counter 50 to the first memory 54 upon receipt of a transfer signal by such AND circuit 55.

The extreme value sensing circuit means further includes first comparing circuit means for comparing the digital signal stored in the main memory 54 with the number of repetitions of the ion current repetitive pulses during the successive sampling intervals for producing the memory transfer signals which are supplied to the AND circuit 55. This comparing circuit means includes AND circuit 56, a main down counter 57 and a zero detector flip-flop 58. It also includes a pair of AND circuits 59 and 60 coupled to the two sides of the flip-flop 58 and an OR circuit 61 connected to the outputs of the AND circuits 59 and 60. The memory transfer pulse appears at the output of OR circuit 61 and is supplied by way of a line 62 to the transfer terminal of AND circuit 55. The ion current repetitive pulses occurring at the output of the sample gate 51 are supplied by way of an OR circuit 63 to the counting input of the main down counter 57. Down counter 57 is a backward or downward counting counter and may be, for example, a six-decade binary coded decimal type of downward counter.

During each intermediate timing interval C, the number then stored in the main memory 54 is transferred to the main down counter 57 by means of the $T_2$ transfer pulse which is supplied to the AND circuit 56. This is a non-destructive readout of the memory 54, the memory 54 continuing to retain the same setting it had just before readout. This sets the main down counter 57 to this number value. Immediately thereafter, an initial single count is supplied to the counting input of the down counter 57, this count being the $T_3$ pulse which is supplied to the OR circuit 63. This $T_3$ pulse is actually the reset pulse R shown in FIG. 2C but is designated by the symbol $T_3$ because it is not actually being used for reset purposes. Immediately following the $T_3$ pulse, the sampling pulse S activates the sampling gate 51 and causes such gate to supply the repetitive pulses by way of the OR circuit 63 to the counting input of the down counter 57. Each pulse supplied to the counting input of such down counter 57 decreases the count value in the counter 57 by one count. The toggle input of the zero detector flip-flop 58 is coupled to the most significant bit stage of the counter 57 and flip-flop 58 responds to a zero to one transition in such stage. Such a transition will occur if the counter 57 counts back one count past the zero setting of such counter.

Initially, the flip-flop 58 is in a condition such that its "no" output line is at the binary one level. This initial condition is established by the reset pulse R supplied thereto. If the number of repetitive pulses counted during the next sampling interval is less than the number transferred from the main memory 54 to the down counter 57, then the down counter 57 does not get all the way back to zero. As a consequence, flip-flop 58 is not triggered and the "no" output line remains at the binary one level. If, on the other hand, the number of repetitive pulses counted during this next sampling interval is equal to or greater than the number transferred from the main memory 54, then the down counter 57 does count one count back past zero. The $T_3$ pulse which was initially counted causes the counter 57 to count back zero for the case where the incoming number is just equal to the number transferred from the main memory 54. The counting of the down counter 57 back past zero supplies a trigger pulse to the flip-flop 58 and switches it so that its "yes" output line goes to the binary one level, the "no" line then going to the zero level.

During the peak sensing mode, the AND circuit 59 is activated by the peak mode control signal P from the mode latch 53 and the AND circuit 60 is disabled. Conversely, in the valley sensing mode the AND circuit 60 is activated by the valley sensing mode control signal V and the AND circuit 59 is disabled.

Considering first the peak sensing mode, if the number of repetitive pulses supplied to the counting input of the down counter 57 is equal to or greater than the earlier number transferred from the memory 54, then flip-flop 58 is triggered and the "yes" line is at the one level. This then enables the $T_1$ transfer pulse occurring during the next intermediate timing interval C to pass through the AND circuit 59 and the OR circuit 61 to provide the memory transfer pulse which is supplied back to the AND circuit 55 to cause it to transfer the new number, which is now in the main up counter 50, to the main memory 54. In other words, the up counter 50 counts the number of incoming pulses at the same time as does the down counter 57 and if this number is equal to or greater than the old number in the main memory 54, it is transferred to the main memory 54 by the memory transfer pulse which is produced at the output of the OR circuit 61. If transferred, it replaces the old number which is thereby destroyed.

In the valley sensing mode, on the other hand, the operation is somewhat similar except that the new number is transferred from the up counter 50 to the memory 54 when it is less than the old number in the memory 54. This is bacause if the new number is less than the old number, then the "no" line of the flip-flop 58 remains at the one level and the $T_1$ transfer pulse during the next intermediate timing interval C is allowed to pass by way of AND circuit 60 and OR circuit 61 to provide the memory transfer pulse which is supplied back to the AND circuit 55.

Thus, during the peak sensing mode, a new number is stored in the memory 54 if it is larger than the old number, while in the valley sensing mode, a new number is stored in the memory 54 if it is smaller than the old number.

The extreme value sensing circuit means further includes circuit means for determining when the number currently stored in the main memory 54 is, in fact, the number representing the maximum value of a data peak and thereupon causing a transfer of this number to the printout register 22 (FIG. 1). This circuit means includes a rate multiplier circuit 64 which is responsive to the ion current repetitive pulses passed by the sample gate 51 for producing a second set of repetitive pulses having repetition rate which is a predetermined fraction of the repetition rate of the ion current repetitive pulses. As indicated by a selector knob 64a, the rate multiplier 64 can be adjusted to provide different fractions for the relationship between the repetitive pulses at the input and output thereof. Rate multiplier 64 includes therein appropriate switches which are operated by the selector knob 64a to provide output pulses having, for example, any one of the following fractional repetition rates relative to the input pulses: 60%, 65%, 70%, 75%, 80%, 85%, 90% or 95%. For sake of an example, it will hereinafter be assumed that the knob 64a is set so that the repetition rate of the output pulses is equal to 95 percent of the repetition rate of the input pulses.

To accomplish this purpose, the rate multiplier 64 includes therein a two-decade binary coded type decimal counter and a series of single-shot multivibrator circuits individually coupled to the different binary stages in the counter. The outputs of these multivibrators are connected by way of selector switches to the input of an OR circuit. These single-shot multivibrators are constructed to detect a particular polarity of transition (for example, zero to one) in their respective counter stages. The selector switches are controlled by the control knob 64a and serve to connect the proper combination of these single-shot multivibrators circuits to the input of the OR circuit, the particular combination determining the fractional relationship which is established.

If desired, the use of the counter in the rate multiplier 64 can be eliminated by instead using the counter stages in the main up counter 50 to provide the same function. In this case, the rate multiplier 64 would instead be connected to the main up counter 50 and would include only the single-shot multivibrators, the OR circuit and the selector switches.

This portion of the extreme value-sensing circuit means also includes a second counting circuit means, represented by an auxiliary up counter 65, for counting the numbers of repetitions of the rate multiplier output repetitive signal occurring during the periodic sampling intervals for developing digital signals representing such numbers. The auxiliary up counter 65 is a forward counting six-decade binary coded type decimal counter. It is reset during the intermediate timing intervals C by reset pulses applied at R. The digital signals developed by the auxiliary up counter 65 are transferred to and stored in a second memory circuit means, represented by auxiliary memory 66, by means of second transfer circuit means, represented by AND circuit 67. Transfer is effected when the AND circuit 67 receives a memory transfer pulse from the OR circuit 61 by way of the line 62. Thus, these transfers occur at the same time as do the transfers to the main memory 54. Auxiliary memory 66 is a six-decade binary coded decimal type storage register capable of storing the binary bits for a single six-digit decimal number. It is set to zero by an external reset pulse X at the beginning of the analysis run.

The output of the auxiliary memory 66 is coupled by way of AND circuits 68 and 69 and OR circuits 70 to an auxiliary down counter 71. Digital signals can also be transferred to the auxiliary down counter 71 from the main memory 54 by way of the AND circuit 56 and an AND circuit 72. The auxiliary down counter 71 is a six-decade binary coded decimal counter of the backward counting type. It is initially set to zero by the external reset pulse X. In the peak sensing mode of operation, the repetitive pulses appearing at the output of the sample gate 51 are supplied to the counting input of the auxiliary down counter 71 by way of the OR circuit 63, an AND circuit 73 and an OR circuit 74. During the valley sensing operating mode, on the other hand, the fractional rate repetitive pulses from the rate multiplier 64 are supplied to the counting input of the counter 71 by way of an AND circuit 75 and the OR circuit 74.

Coupled to the most significant bit stage of the down counter 71 is the toggle input of a zero detector flip-flop 76. Output lines from the two sides of the flip-flop 76 are connected to first inputs of AND circuits 77 and 78. The outputs of AND circuits 77 and 78 are, in turn, connected to the two inputs of an OR circuit 79. The output of OR circuit 79 is coupled to the toggle input of the mode latch flip-flop 53. The P and V outputs of the mode latch 53 are connected back to the AND circuits 77 and 78, respectively, such that AND circuit 77 will be enabled and AND circuit 78 will be disabled for the peak sensing mode and vice versa for the valley sensing mode.

During the peak sensing operating mode, the auxiliary down counter 71 functions to compare the fractional rate number in the auxiliary memory 66 with the pulse numbers appearing as the output of the sample gate 51 during the successive sampling intervals. In this mode, the fractional rate number in the auxiliary memory 66 is set into the down counter 71 by way of AND gates 68 and 69 and the OR circuit 70 by the $T_2$ transfer pulse supplied to the AND gate 68 during each intermediate timing interval C (non-destructive readout of memory 66). During the sampling intervals, the repetitive pulses from sample gate 51 are applied to the counting input of counter 71 by way of OR circuit 63, AND circuit 73 and OR circuit 74. In response to these repetitive pulses at the counting input, the down counter 71 counts backwards toward zero. If the pulse number from sample gate 51 is larger than the original starting number set in from the auxiliary memory 66, then the down counter 71 will count back past zero and, as it passes from its zero count condition to its maximum count condition, it produces an output pulse which is supplied to the zero detector flip-flop 76. Initially, the flip-flop 76 is set to the "no" condition by the reset pulse R occurring during the intermediate timing interval C. This places the "no" output line at the binary one level and the "yes" output line at the binary zero level. The pulse from the down counter 71 sets the flip-flop 76 to the "yes" condition, wherein the "yes" line is at the one level and the "no" line is at the zero level. If, on the other hand, the incoming pulse number from the sample gate 51 should be less than the number transferred from the auxiliary memory 66, then down counter 71 does not produce an output pulse and the zero detector flip-flop 76 will remain in the "no" condition.

During the peak sensing mode, the AND circuit 77 determines during the next intermediate timing interval C whether the flip-flop 76 has remained in the "no" condition or has switched to the "yes" condition. If it has remained in the "no" condition (new number smaller than fractional rate number in memory), then the $T_1$ transfer pulse during the next intermediate timing interval C is allowed to pass through the AND circuit 77 and thence through the OR circuit 79 to the toggle input of the mode latch 53. Such a pulse switches the mode latch 53 to the valley sensing mode. As will be seen, this occurs after a data peak has reached its maximum value and has started to decline. The amount of decline required to occur before the mode latch 53 is switched is determined by the setting of the selector knob 64a of the rate multiplier 64. Thus, if the rate multiplier knob 64a is set to the 95 percent position, then the mode latch 53 will be switched when the peak fluctuation declines to a point where the signal amplitude is 95 per cent of the maximum signal amplitude. This constitutes a 5 percent decrease from such maximum value.

with the peak height logic 20 in the valley sensing operating mode, the auxiliary down counter 71 operates to perform a somewhat different comparison. In this case, counter 71 operates to compare the old number in the main memory 54 with the fractional rate pulse numbers appearing at the output of the rate multiplier 64 during the succeeding sampling intervals. In particular, the number in the main memory 54 is transferred and set into the down counter 71 by way of AND circuits 56 and 72 and OR circuit 70 by the $T_2$ transfer pulse supplied to the AND circuit 56 during each intermediate timing interval C. The new fractional rate pulse number from the rate multiplier 64, on the other hand, is supplied to the counting input of the down counter 71 by way of AND circuit 75 and OR circuit 74. If the new fractional rate pulse number is greater than the old number set in from the main memory 54, then down counter 71 counts back past zero and supplies an output pulse to the zero detector flip-flop 76 for purposes of setting it to its "yes" condition. Otherwise, flip-flop 76 remains in its "no" condition. If flip-flop 76 is switched to its "yes" condition, then AND circuit 78 will, during the next intermediate timing interval C, pass a $T_1$ transfer pulse to the OR circuit 79 which, in turn, will pass it to the toggle input of the mode latch 53. This switches the mode latch 53 back to the peak sensing operating mode. Such switching back to the peak mode occurs when the ion current signal starts to rise up from its valley level. It occurs when the ion current signal has increased to an amplitude level which is 105 percent of the minimum value of the valley. In other words, this happens when the signal increases by 5 percent with respect to the bottom of the valley. As before, this percentage change factor is determined by the setting of the control knob 64a of the rate multiplier 64, the percentages just given being for the assumed case of a 95 percent fractional rate setting.

The peak height logic 20 starts off initially in the peak sensing mode P, then switches to the valley sensing mode V when the measurement signal begins to decline from its maximum value, then switches back to the peak mode P when the measurement signal begins to increase again and then switches back to the valley mode V when the signal again begins to decline from its maximum value. This switching back and forth continues until the scanning operation within the mass spectrometer 10 is completed, that is, until the mass spectrometer has completed its analysis run.

The various $T_1$, $T_2$ and $T_3$ transfer pulse terminals and R reset pulse terminals in FIG. 3 are connected to the appropriate output lines of the timing circuits 28 of FIG. 1. The external reset pulse terminals "X" are connected to a manually operated reset pulse generator (not shown). Such generator might take the form of a one-shot pulse generator circuit having a push-button type trigger switch.

The extreme value sensing circuit portion of the peak height logic 20 further includes circuit means responsive to the switching of the mode control circuit means represented by the mode latch flip-flop 53 for transferring selected ones of the digital signals in the first or main memory circuit 54 to the output terminal means represented by the printout register 22 (FIG. 1). In this regard, the transitions in the peak mode and valley mode control signals appearing on the P and V output lines of the mode latch flip-flop 53 are utilized as readout command signals. A one-to-zero transition in the binary signal level on output line P is used as a readout command for transferring the digital value representing the maximum value of a peak, while a one-to-zero transition in the signal level on the output line V is used as a readout command for transferring the digital signal representing the minimum value of a valley.

To provide the maximum value transfer, the mode control signal on the mode latch output line P is supplied to the input of a one-shot multivibrator circuit 80. Each peak-to-valley (one-to-zero) transition in the peak mode control signal P triggers the one-shot circuit 80 and causes this circuit to produce an output pulse. This output pulse is supplied by way of an AND gate 81 to an AND gate 82, provided the other inputs to the AND gate 81 are at the binary one level. AND gate 82 is coupled in series between the output of the main memory 54 and the input of the printout register 22. The supplying of a pulse from AND gate 81 to AND gate 82 causes the AND gate 82 to transfer to the printout register 22 a digital signal corresponding to the digital signal in the main memory 54 at that instant, provided the two input lines on the left side of AND gate 82 are at the binary one level. This is a non-destructive readout of the main memory 54.

The pulse at the output of the AND gate 81 is also supplied to the line 23 running to the print command input of the printer 24 (FIG. 1). The printer 24 includes sufficient time delay so that the printing action does not occur until the transferred digital number has been properly entered in the printout register 22. The output pulse from AND gate 81 is also supplied to the mass number logic 25 by way of the line 26. As will be seen, a pulse on line 26 causes a readout of the digital signal then being held in memory in the mass number logic 25.

The valley mode control signal on mode latch output line V is, when desired, supplied to a further one-shot multivibrator circuit 83 by way of a switch 84. In other words, when switch 84 is closed each valley-to-peak (one-to-zero) transition appearing on the mode latch output line V triggers the one-shot circuit 83 and causes it to produce a short duration output pulse. This output pulse is supplied by way of an OR circuit 85 to the input of the AND gate 81. This pulse is then supplied by way of AND gate 81 to the AND gate 82 to cause a transfer to the print-out register 22 of a digital signal corresponding to the digital signal then in the main memory 54. This signal corresponds to the minimum value of a valley in the measurement (ion current) signal. Switch 84 gives the user of the system the choice of either printing or not printing the minimum valley values.

The peak height logic 20 further includes circuit means operative at the beginning of each increasing fluctuation in the ion current signal and responsive to the ion current repetitive pulses from the voltage-to-frequency converter 15 during each sampling interval for disabling the transfer of any digital signal to the printout register 22 until the occurrence of a sampling interval which includes at least a predetermined number of repetitions of such ion current repetitive pulses. As a consequence, the readout system is prevented from producing an output digital signal for an increasing fluctuation having less than a predetermined maximum amplitude value. Among other things, this prevents the readout of spurious noise peaks near the base line level. This circuit means includes a minimum peak height flip-flop circuit 86 having a set input terminal which is connected by way of a selector switch 87 to one of the lower order counting stages in the main up counter 50. In order to reset the minimum peak height flip-flop 86 at the beginning of each increasing data signal fluctuation, there is provided a one-shot multivibrator circuit 88 having an input connected to the output line V of the mode latch 53. One-shot circuit 88 is responsive to each valley-to-peak (one-to-zero) transition in the valley mode control signal V for producing a short duration output pulse. This pulse is supplied by way of a time delay circuit 89, an OR circuit 90 and a line 91 to the reset input terminal of the minimum peak height flip-flop 86. An external reset pulse can also be supplied to the "X" terminal of the OR circuit 90 for resetting the minimum peak height flip-flop 86.

The minimum peak height flip-flop 86 is reset at the beginning of each increasing signal fluctuation by the pulse produced by the one-shot circuit 88. In its reset condition, the flip-flop 86 provides a binary zero level output on an output line 92. This zero level on line 92 disables the readout transfer AND gate 82 as well as the AND gate 81. This disabled condition continues until a sampling pulse interval occurs wherein the number of pulses counted by the main up counter 50 is sufficient to cause a pulse to be produced at the tap of the selector switch 87 to which the movable arm member of the switch 87 is connected. Such an occurrence indicates that during that sampling interval the measurement (ion current) signal is greater than the predetermined threshold level represented by the setting of the selector switch 87. The appearance of the pulse at the selected selector switch output tap shifts the flip-flop 86 to its set condition. This produces a one level output on the output line 92. This activates or enables the AND gates 82 and 81 so that they can pass or respond to the pulse produced when the one-shot circuit 80 fires. Delay circuit 89 provides a short duration time delay for enabling the readout of a valid minimum valley value (if switch 84 is closed) before the minimum peak height flip-flop 86 is reset by the pulse from the one-shot circuit 88.

The peak height logic 20 also includes circuit means operative at the beginning of each increasing fluctuation in the measurement signal for disabling the transfer of digital signals to the printout register 22 until a predetermined minimum number of sampling intervals have occurred. This prevents the readout of a digital value for a data peak or other fluctuation which has not been sampled often enough to insure that the resulting digital signal is truly representative of its maximum value. This circuit means includes a minimum sample counter 93 having its counting input terminal coupled to the sampling pulse input line 31 by way of an AND circuit 94. A second input of AND circuit 94 is connected to the output line P of the mode latch 53 so that the AND circuit 94 is enabled or rendered operative only during the peak sensing operating mode. The output line of the minimum sample counter 93 is connected to the set terminal of a flip-flop circuit 95. The output line 96 of flip-flop 95 is connected to the AND gates 81 and 82 for controlling the operation thereof. Selector knob 93a of the minimum sample counter 93 serves to adjust the counting capacity of the counter 93 or, in other words, the number of pulses that have to be counted before an output pulse is produced.

Both the minimum sample counter 93 and the flip-flop circuit 95 are reset at the beginning of each increasing fluctuation in the measurement signal by the pulse produced by the one-shot circuit 88. This produces a binary zero level on the output line 96 which, in turn, disables AND gates 81 and 82. During the ensuing increasing signal fluctuation, the AND circuit 94 is activated and the minimum sample counter 93 operates to count the number of sampling pulses on line 31. As soon as the proper number of sampling pulses are counted (determined by setting of selector knob 93a), counter 93 supplies an output pulse to the flip-flop circuit 95 which shifts flip-flop circuit 95 to its set condition. This produces a binary one level output signal on the output line 96 of flip-flop 95. This, in turn, enables the AND gates 81 and 82 so that they can function to cause the transfer of the digital signal representing the maximum value of the fluctuation.

Referring now to FIG. 4 of the draings, there is shown in greater detail the construction of the mass number logic 25 of FIG. 1. This mass number logic 25 has six different possible operating modes. A desired one of these modes is selected by means of a multiple section selector switch formed by switch sections 101a, 101b, and 101d. Each selector switch section includes a movable contact arm and a series of six stationary contacts. Switch section 101a, for example, includes contact arm 102a and stationary contacts 103a. The movable contact arms 102a, 102b, 102c, and 102d of the different switch sections are mechanically ganged together so that for any given setting all of the contact arms are at the same numbered stationary contact positions.

The accelerating voltage signal A and the magnetic field intensity signal B are supplied to the first and second converter circuit means represented by the voltage-to-frequency converters 17 and 19, which are repeated in FIG. 4 for sake of continuity. Each of the converters 17 and 19 produces a repetitive signal in the form of a train of repetitive pulses having a repetition rate dependent on the amplitude of the analog signal supplied to the input thereof. These converters 17 and 19 may be constructed to operate over a range of, for example, zero to five megahertz. Converters 17 and 19 are provided with zero adjustment potentiometers 104 and 105, respectively, each of which is connected between +V and −V direct-current voltage supply terminals. These potentiometers 104 and 105 are adjusted to provide desired pulse rates from the converters 17 and 19 when the A and B input signals are at their minimum values. The output of converter 17 is connected to stationary contact positions one, three and five of the selector switch section 101a. The output of converter 19 is connected to stationary contact position number two of switch section 101a stationary contact positions four and five of switch section 101b.

The mass number logic 25 further includes timing circuit means for supplying a repetitive timing signal having a constant repetition rate. This means includes the clock pulse input line 35 running from the clock oscillator 30 of FIG. 1. As previously indicated, these clock pulses on line 35 may have a repetition rate of, for example, 10 megahertz. Clock pulse input line 35 is coupled by way of a divide-by-ten frequency divider circuit 106 to stationary contact position four of switch section 101a. It is also connected by way of a line 107 to stationary contact position three of switch section 101c.

The mass number logic 25 also includes counting circuit means which is adapted to count the numbers of repetitions of a repetitive signal occurring during the periodic sampling intervals S for developing digital signals representing such numbers. This counting circuit means includes a counter 108 which may be, for example, a five decade binary coded decimal counter. Counter 108 is adapted to be reset to zero by means of reset pulses R supplied thereto by way of an AND circuit 109 during the intermediate timing intervals C. Coupled to the output of the counter 108 is an AND circuit 110 which, in turn, is coupled to the input of a memory circuit 111. Memory circuit 111 is, for example, a one word storage register for storing the most recent multi-digit number transferred thereto. Transfer to the memory 111 occurs when a memory transfer pulse is supplied over the line 36 to the AND circuit 110.

As will be recalled, the memory transfer pulses on line 36 are produced by the zero detector flip-flop 58 and associated AND and OR circuits in the peak height logic 20 of FIG. 3. Thus, during the peak sensing operating mode of the peak height logic 20, digital signals are transferred from the counter 108 to the memory 111 immediately following each sampling interval wherein the new ion current amplitude value is greater than the previous ion current amplitude value. During the valley sensing operating mode, on the other hand, a digital signal is transferred from the counter 108 to the memory 111 immediately following each sampling interval wherein the new ion current amplitude value is less than the previous ion current amplitude value. Thus, the contents of memory 111 are continuously updated in the same manner as was the contents of the main memory 54 of the peak height logic 20.

The digital signal in the memory circuit 111 is adapted to be transferred at the appropriate moments by way of an AND circuit 112 and the cable 27 to the printout register 22 (FIG. 1). Readout command signals are supplied to the AND circuit 112 by way of line 26 and are effective to cause a transfer to the printout register 22, provided the signals on the minimum height line 92 and the minimum sample line 96 are not at the disabling (binary zero) level. The readout commands on line 26 are produced by the extreme value sensing circuit portion of the peak height logic 20 of FIG. 3. The digital signal contained in the counter 108 is also supplied to the digital display 38 (FIG. 1) by way of cable 41, provided switch mechanism 39 is at the cable 41 position.

The mass number logic 25 of FIG. 4 further includes computing circuit means responsive to a repetitive signal during the periodic sampling intervals for developing during each sampling interval a gating signal having a time duration which is inversely proportional to the number of repetitions of the input repetitive signal during such sampling interval. This reciprocal computing circuit means includes a down counter 113 which is coupled by way of an AND circuit 114 to the movable contact arm 102a. Sampling pulses S are supplied to a second input of the AND circuit 114. Down counter 113 is of the backward or reverse counting type, each pulse supplied to the input thereof serving to reduce the count value in the counter 113 by one count. Connected to the individual stages of the down counter 113 are a set of preset switches 115. At the appropriate moments, these preset switches 115 are used to set a predetermined number value into the counter 113. Switches 115 are of an adjustable nature so that the user of the appartatus can select the preset number to be used.

The overflow output of down counter 113 is connected to the set input of a flip-flop circuit 116. Reset pulses R are supplied to the reset input of such flip-flop 116. One side of the flip-flop 116, designated as the "yes" side, is coupled by way of an OR circuit 117 to the reset input of a further flip-flop circuit 118. The set input of flip-flop 118 is connected to the output of the AND circuit 114. As will be seen, output line 120 for the flip-flop 118 constitutes the output line for the reciprocal computer circuit means. The "no" side of flip-flop 116 is coupled by way of an AND circuit 121 to a second input of the OR circuit 117. The output of AND circuit 121 is also connected to the set input of a flip-flop circuit 122. Flip-flop 122 drives an indicator lamp 123 for providing a warning when the number supplied by preset switches 115 is too large. Flip-flop 122 is reset by manual operation of a reset switch 124.

Considering the operation of this reciprocal computer circuit means, the down counter 113 is reset to zero by the transfer pulse $T_2$. It is then preset to the number represented by preset switches 115 by the transfer pulse $T_3$ (which is acutally the reset pulse R). At the same time, flip-flop 116 is reset to its "no" condition and, as will be seen, flip-flop 118 is also in its reset condition. During the ensuing sampling pulse S, the down counter 113 begins counting downward from its preset number in response to the pulses supplied by the AND circuit 114. The first of these pulses also serves to shift the flip-flop 118 to its set condition. This causes the output line 120 to go to the binary one level. Eventually the counter 113 counts back past zero. At the moment it passes zero, it produces an output signal transition which is supplied to flip-flop 116 and shifts same to its "yes" condition. The resulting transition on the "yes" output line of flip-flop 116 is supplied by way of OR circuit 117 to the flip-flop 118 for shifting same to its reset condition. This causes the signal level on the output line 120 to return to its binary zero value. The time required for the counter 113 to count from the preset number back to zero is inversely proportional to the repetition rate of the pulses supplied by the AND circuit 114. The higher the repetition rate, the quicker the counter returns to zero and, hence, the shorter the required time. As a consequence, the binary one level signal on output line 120 is a signal having a time duration which is inversely proportional to the repetition rate of the repetitive pulses from the AND circuit 114. As will be seen, the recurrent one level signals on output line 120 are used as gating signals.

In the event that the down counter 113 should not count all the way back to zero, then flip-flop 118 is nevertheless reset during the next intermediate timing interval C by the $T_1$ transfer pulse supplied to the AND circuit 121. In such event, this pulse is also supplied to the flip-flop 122 for shifting it to its set condition. This lights the indicator lamp 123 which, in turn, warns the operator that the preset number provided by switches 115 was too large for this particular pulse repetition rate. In other words, for the gating signals on ouput line 120 to have any meaning, their duration must be shorter than the duration of the sampling pulses S.

The mass number logic 25 also includes gating circuit means for controlling the flow of repetitive pulses to the counter 108. This gating circuit means includes AND circuits 125, 126 and 127, the outputs of which are connected to an OR circuit 128 which, in turn, is connected to the counting input of the counter 108. A particular one of these AND circuits 125, 126 and 127 is operative during each one of the six operating modes, the other two being disabled. The particular one of these AND circuits which is rendered operative is controlled by a constant binary one level voltage $V_1$ which is supplied to the movable contact arm 102d of the selector switch section 101d. This $V_1$ voltage is obtained from a suitable direct-current voltage source. In operating Modes One and Two, this $V_1$ voltage is supplied by way of stationary contact positions one and two of switch section 101d and an OR circuit 129 to the AND circuit 127 for activating same. During Mode Three, the $V_1$ voltage is supplied by way of contact position three to the AND circuit 125 for activating same. During Modes Four and Five it is supplied by way of switch contact positions four and five to the AND circuit 126 for activating same. During Mode Six, the $V_1$ voltage is supplied by way of OR circuit 129 and a further OR circuit 130 to two different input terminals of the AND circuit 127 for purposes of activating same. In this latter mode, the $V_1$ voltage is also supplied to an inverter circuit 131, the output of which is coupled to AND circuit 109 for purposes of disabling this AND circuit 109 during Mode Six. During the other operating modes, inverter circuit 131 holds the AND circuit 109 in an operative condition so that reset pulses R may pass therethrough to reset terminal of the counter 108.

The mass number logic 25 further includes squaring circuit means responsive to a repetitive signal for producing a further repetitive signal having a repetition rate which varies as the square of the variation of the repetition rate of the input repetitive signal. This squaring circuit means is represented by squaring logic 132. The details of this squaring logic 132 are shown in FIG. 5 and will be discussed hereinafter in connection with such FIG. 5. As indicated in FIG. 4, the input of the squaring logic 132 is coupled by way of an AND circuit 133 to the movable contact arm 102b of switch section 101b. AND circuit 133 is periodically activated by the sampling pulses S to enable such circuit to pass on to the squaring logic 132 any pulses that may be present on the contact arm 102b. The output of squaring logic 132 is connected to stationary contact positions four and five of switch section 101c. The output of AND circuit 133 is also connected by way of a line 134 to additional inputs of AND circuits 125 and 126.

The mass number logic 25 also includes various scaling circuit means for use in adjusting the overall scale factor of the mass number logic 25 in the different ones of its operating modes. A first of these scaling circuit means is represented by a frequency divider 135 which is connected between the movable contact arm 102a of switch section 101a and contact positions one and two of switch section 101b. Frequency divider 135 is an adjustable capacity pulse counter which includes a control knob 135a for adjusting the division factor or count down ratio of the divider 135. As will be seen, the divider 135 is utilized during the first and second operating modes for controlling the proportionality constant factor $K_1$. A further scaling circuit means is represented by a frequency divider 136 which is connected between the movable contact arm 102c of switch section 101c and one of the inputs of the AND circuit 126. This frequency divider 136 is an adjustable capacity pulse counter which includes a control knob 136a for enabling adjustment of the division factor or count down ratio of the divider 136. As will be seen, the frequency divider 136, together with the preset switches 115, serves to control the $K_2$ proportionality constant factor which is used in operating Modes Three, Four and Five. The output of divider 136 is also connected back to stationary contact position three of switch section 101b by way of line 137.

Considering now a first of the operating modes, namely, Mode One, such mode is established by setting the movable contact arms 102a, 102b, 102c and 102d to their number one stationary contact positions. In this mode, it is desired that the counter 108 should count the repetitive pulses from the voltage-to-frequency converter 17 during each of the sampling intervals S and to produce digital signals representing numbers proportional to the numbers of such pulses. During this mode, AND circuit 127 is activated by the $V_1$ voltage supplied by way of OR circuit 129, while AND circuits 125 and 126 remain disabled. The repetitive pulses from the voltage-to-frequency converter 17 are supplied by way of switch section 101a, frequency divider 135, switch section 101b, AND circuit 133, line 134, AND circuit 127 and OR circuit 128 to the counting input of the counter 108.

Each of the successive numbers developed by the counter 108 during the successive sampling intervals is transferred to memory 111 so long as the ion current signal from the spectrometer 10 continues to increase. This is accomplished by the memory transfer pulses on line 36. After the ion current signal has passed through its maximum value and has declined by a predetermined percentage, then a readout command pulse appears on line 26 which causes the AND circuit 112 to transfer to the printout register 22 (FIG. 1) a digital signal corresponding to the digital signal then present in the memory 111. This digital signal represents a number which is proportional to the value of the spectrometer accelerating voltage during the sampling interval during which occurred the maximum value of the spectrometer ion current signal.

By proper adjustment of the control knob 135a of frequency divider 135, the zero adjustment potentiometer 104 and the control knob 16a associated with the scaling amplifier 16 (FIG. 1), the numbers developed by the counter 108 can be made to read directly in terms of the accelerating voltage values. Otherwise, these numbers are proportional to the accelerating voltage values with the proportionality constant being other than unity.

Mode Two operation of the mass number logic 25 is obtained by setting the movable contact arms 102a, 102b, 102c and 102d to their number two stationary contact positions. This mode of operation is the same as that for Mode One except that the output of voltage-to-frequency converter 19 is now used to drive the frequency divider 135. Thus, the numbers developed by the counter 108 are directly proportional to the magnetic field intensity values represented by the field intensity signal B. By proper adjustment of the frequency divider control knob 135a, the potentiometer 105 and the scaling amplifier control knob 18a (FIG. 1), the system can be calibrated so that the counter 108 reads directly in terms of field intensity units.

Considering now the Mode Three operation, this mode is established by setting the movable contact arms 102a, 102b, 102c and 102d to their number three stationary contact positions. In this mode, it is desired that the mass number logic 25 should respond to the accelerating voltage signal A alone and to produce from this signal numbers in the counter 108 which are proportional to the mass number values for the ions passing through the exit slit in the spectrometer 10. As indicated by the chart given in FIG. 4, the mass number value in this case is inversely proportional to the amplitude of the accelerating voltage signal A. Thus, in this mode of operation, it is necessary to utilize the reciprocal computer circuit means associated with the down counter 113.

In this Mode Three operation, the AND circuit 125 is activated by the $V_1$ voltage supplied thereto by the switch section 101d, the other two AND circuits 126 and 127 remaining disabled during this mode. Supplied to the second input of the AND circuit 125 are the constant repetition rate clock pulses present on the clock pulse input line 35. These clock pulses are supplied to the AND circuit 125 by way of line 35, line 107, switch section 101c, frequency divider 136, line 137, switch section 101b, AND circuit 133 and line 134. These constant rate clock pulses are passed by the AND circuit 125 and the OR circuit 128 to the counting input of the counter 108 during the occurrence of the reciprocal computer gating signals on reciprocal computer output line 120, this line 120 being connected to the first input of the AND circuit 125. At this time, the output of the voltage-to-frequency converter 17 is being supplied by way of the switch section 101a and the AND circuit 114 to the input of the down counter 113. As a consequence, the durations of the gating signals on the reciprocal computer output line 120 are inversely proportional to the amplitude values of the accelerating voltage signal A. As a further consequence, the number of constant rate clock pulses counted by the counter 108 for each of the gating signals on line 120 is likewise inversely proportional to the amplitude value of the accelerating voltage signal A. Thus, the counter 108 develops digital signals representing numbers which are directly proportional to the mass number values.

By proper adjustment of the frequency divider control knob 136a, the preset switches 115, potentiometer 104 and scaling amplifier control knob 16a (FIG. 1), the counter 108 can be caused to read directly in terms of mass number units (except that no decimal point is shown). This is done by first switching to Mode One and adjusting the potentiometer 104 to provide a zero reading for counter 108 for a zero input signal. A signal corresponding to the maximum value of the accelerating voltage signal is then applied at the input of the scaling amplifier 16 and the gain control knob 16a is adjusted until the counter 108 provides a full scale reading. The selector switch sections 101a, 101b, 101c and 101d are then returned to the Mode Three positions. To determine the maximum setting for the preset switches 115, a signal corresponding to the minimum accelerating voltage to be used is supplied to the input of the scaling amplifier 16 and the number value represented by the preset switches 115 is increased until the indicator lamp 123 glows. The number provided by the preset switches 115 should always be less than this value. A signal corresponding to the value of the accelerating voltage signal for an ion current peak of known mass number is then supplied to the input of the scaling amplifier 16. The preset switches 115 and the frequency divider control knob 136a are then adjusted until this known mass number is indicated by the counter 108. The counter 108 indications are observed by means of the digital display 38, the switch mechanism 39 being set at the cable 41 position for this purpose. This completes the calibration to provide the direct readout of mass numbers for Mode Three.

The Mode Four operation of the mass number logic 25 is obtained by setting the movable contact arms 102a, 102b, 102c and 102d to their number four stationary contact positions. In this mode, it is desired that the mass number logic 25 should respond to the magnetic field intensity signal B alone and to develop in the counter 108 digital signals representing numbers proportional to the mass number values. These mass number values are, in this case, proportional to the square of the amplitude values of the magnetic field intensity signal B. In this mode, the $V_1$ voltage supplied to the switch section 101d serves to activate the AND circuit 126, the AND circuits 125 and 127 remaining disabled.

In Mode Four, the repetitive pulses from the voltage-to-frequency converter 19 are supplied by way of switch section 101b and the AND circuit 133 to the input of the squaring logic 132. In response thereto, squaring logic 132 produces output pulses having a repetition rate which varies as the square of the variation in the pulse repetition rate at the input of the squaring logic 132. This output signal from squaring logic 132 is then supplied by way of switch section 101c and frequency divider 136 to the AND circuit 126. At the same time, fixed duration gating signals are supplied to the first input of the AND circuit 126 by way of the reciprocal computer output line 120. These fixed duration gating signals are obtained by supplying the clock pulses on line 35 by way of the divide-by-ten counter 106, switch section 101a and AND circuit 114 to the input of the down counter 113. The resulting gating signals on output line 120 are of fixed duration because the divided down clock pulses which are driving the down counter 113 are of a fixed repetition rate. Since the gating signals are of a fixed or non-varying duration, the numbers of pulses passed by the AND circuit 126 during the successive gating signal intervals are proportional to the square of the magnetic field intensity values. As a consequence, the digital signals developed by the counter 108 are proportional to the corresponding mass number values.

By proper adjustment of the preset switches 115, the frequency divider control knob 136a, potentiometer 105 and scaling amplifier control knob 18a (FIG. 1), the counter 108 can be made to read directly in terms of mass number units.

Considering now the Mode Five operation, such operation is established by setting the movable contact arms 102a, 102b, 102c and 102d to their number five stationary contact positions. The $V_1$ voltage supplied to the contact arm 102d activates the AND circuit 126, AND circuits 125 and 127 remaining disabled. In this operating mode, it is desired that the mass number logic 25 should respond to both the accelerating voltage signal A and the magnetic field intensity signal B for causing the counter 108 to produce numbers proportional to the spectrometer mass number values. In this case, mass number value is proportional to the magnetic field intensity squared divided by the accelerating voltage. To this end, the accelerating voltage signal pulses produced by the voltage-to-frequency converter 17 are supplied by way of switch section 101a and the AND circuit 114 to the input of the down counter 113. The reciprocal computing action provided by the down counter 113 and the circuits associated therewith produces on the reciprocal computer output line 120 variable width gating pulses having widths or time durations which are inversely proportional to the accelerating voltage values.

The pulses produced by the voltage-to-frequency converter 19 in response to the magnetic field intensity signal B, on the other hand, are supplied by way of switch section 101b and the AND circuit 133 to the input of the squaring logic 132. The repetition rate of the output pulses from squaring logic 132 vary as the square of the repetition rate of the pulses supplied by the converter 19. These output pulses from squaring logic 132 are supplied by way of switch section 101c and frequency divider 136 to the AND circuit 126. These pulses are gated through the AND circuit 126 by the gating signals on the reciprocating computer output line 120 and are thence supplied by way of OR circuit 128 to the counter 108.

Since the pulse rate during any given sampling interval is proportional to the square of the magnetic field intensity value and since the duration of the gating pulse on the line 120 during this same sampling interval is inversely proportional to the accelerating voltage value, the total number of pulses (rate X duration) reaching the counter 108 during this sampling interval is proportional to the square of the field intensity value divided by the accelerating voltage value. Thus, the number represented by the digital signal developed by the counter 108 is proportional to the mass number value.

By proper adjustment of the preset switches 115 and the frequency divider control knob 136a, with signals from a known mass number being applied to the inputs of the scaling amplifiers 16 and 18, the counter 108 can be made to read directly in terms of mass number units (except that the decimal point does not appear).

Mode Six operation is established by setting the movable contact arms 102a, 102b, 102c and 102d to their number six stationary contact positions. This activates the AND circuit 127, the other two AND circuits 125 and 126 remaining disabled. In this mode, it is desired to count the number of time intervals of fixed duration which have elapsed since the beginning of the analysis run by the spectrometer 10. In other words, it is desired to keep a running total of the elapsed time. This is accomplished by causing the counter 108 to count the sampling pulses S. These sampling pulses are supplied to the counter 108 by way of the AND circuit 127 and the OR circuit 128. In order to prevent a resetting of the counter 108 by the reset pulses R, the $V_1$ voltage is also applied to the input of the inverter circuit 131. This binary one level input to the inverter 131 produces a binary zero level output which causes the AND circuit 109 to be disabled. If this were not done, the reset pulses R would reset the counter 108 after each sampling interval and the counter 108 would not accumulate the elapsed time count. In this mode, each count counted by the counter 108 represents the length of time required for one sampling pulse S plus one intermediate timing interval C. The former is known from the setting of the timing circuit selector knob 28a (FIG. 1) and the latter is a known fixed value which is established by the construction of the timing circuits 28.

Referring now to FIG. 5 of the drawings, there is shown in greater detail the internal construction of the squaring logic 132 of FIG. 4. The purpose of this squaring logic 132 is to produce during each sampling interval a train of output pulses having a repetition rate which is proportional to the square of the repetition rate of the input pulse train. As will be seen, the proportionality constant is less than unity. This squaring logic 132 includes a multistage binary counter 140 for counting the input pulses. It also includes a multistage transfer circuit 141 for transferring to a multistage memory 142 a digital signal corresponding to the digital signal in the counter 140 at the moment of transfer. Memory 142 may take the form of a storage register and is adapted to hold one multi-bit digital signal at a time.

The output lines from memory 142 are connected to first inputs of individual ones of a set of AND circuits 143-150. The output lines of the counter 140 are also connected to second inputs of individual ones of the AND circuits 143-150, but with one important difference. The sequence of connection of the stages of the counter 140 to the AND circuits 143-150 is reversed compared to the sequence of connection of the stages of the memory 142 to these AND circuits 143-150. Assuming for the moment that the counter 140 is an eight stage counter and that the memory 142 is an eight stage memory, then the first order (least significant bit) stage of the counter 140 and the eighth order (most significant bit) stage of the memory 142 are connected to the first AND circuit 143, the second order stage of the counter 140 and the seventh order stage of the memory 142 are connected to the second AND circuit 144, and so forth, with the highest or eighth order stage of the counter 140 and the lowest or first order stage of the memory 142 being connected to the eighth AND circuit 150.

The output of AND circuits 143-150 are connected to the inputs of single-shot multivibrator circuits 151-158, respectively. Each of these single-shot multivibrator circuits 151-158 is constructed to recognize a particular direction of binary signal transition (for example, a zero-to-one transition) at its input and in response thereto to produce a short duration output pulse. The outputs of the single-shot multivibrator circuits 151-158 are connected to an OR circuit 159 for producing on an output line 160 thereof a composite pulse train formed by the individual pulses developed by the different ones of the single-shot circuits 151-158.

The particular embodiment of squaring logic shown in FIG. 5 is represented as including an eight stage counter 140, an eight stage set of transfer circuits 141, an eight stage memory 142, eight AND circuits 143-150 and eight single-shot circuits 151-158. As such, it can be called an eight-bit binary system. Such an eight-bit system will operate to accomplish the desired purpose, but it should be recognized that, in practice, a system using a greater number of bits will generally be preferred. This enables the system to handle a wider range of pulse repetition rates. Thus, in practice, the squaring logic 132 may be constructed to handle sixteen bits or more (by increasing the number of stages in units 140, 141 and 142 and the number of AND and single-shot circuits), depending on the maximum number of pulses that might be applied to the input of the counter 140 during a single sampling interval. Consequently, the eight-bit system shown in FIG. 5 is in the nature of a simplified system for purposes of explaining the basic principle of the squaring logic operation.

Considering now the operation of the squaring logic shown in FIG. 5, it is initially assumed that the counter 140 has just been reset to its zero count condition. During the ensuing sampling interval S, the pulses occurring during such sampling interval are supplied to the counting input of the counter 140 and counted by such counter 140. During the following intermediate timing interval C, the $T_2$ transfer pulse applied to transfer circuits 141 sets the stages of the memory 142 so that they duplicate the settings of the stages in the counter 140. The counter 140 is then reset by the reset pulse R occurring immediately after the transfer pulse $T_2$. During the following sampling interval S, the binary signals on the output lines of the memory 142 are used to selectively activate or enable various ones of the AND circuits 143-150. In other words, when a particular output line from the memory 142 is at a binary one level, then the AND circuit to which it is connected is rendered operative. On the other hand, when the binary level is zero, the AND circuit is disabled. During this same sampling interval, the ones of the AND circuits 143–150 which have been activated respond to the switching transitions in their respective ones of the stages in the counter 140. More precisely, these AND circuits pass the switching transitions on to their particular ones of the single-shot circuits 151–158. These transitions, when in the proper direction (for example, zero-to-one), serve to trigger the single-shot circuits to which they are applied. The various pulses from the single-shot circuits 150–158 are then gathered together by the OR circuit 159 and placed on the common output line 160.

This squaring process is a repetitive process. The memory 142 holds the digital signal for a first sampling interval and uses it to control the AND circuits 143–150 during a second sampling interval while the counter 140 is counting the second batch of pulses. When this is completed, the second digital signal is transferred to the memory 142 and is effective during the third sampling interval to control the AND circuits 143–150 while the counter 140 is counting the third batch of pulses. This process is repeated for the fourth, fifth, etc., batches of pulses. In view of the fact that the digital signal for one sampling interval is being used in connection with the digital signal for the next sampling interval, then it is necessary for purposes of obtaining a high degree of accuracy that the original analog signal not have changed to a very appreciable extent from one sample to the next. This objective is accomplished by utilizing a fairly rapid sampling rate relative to the rate of variation of the analog signal.

To obtain an intuitive understanding of the logic process, assume initially that the input pulse repetition rate is the maximum that can be handled by the system. For the eight-bit system shown in FIG. 5, this means that the repetition rate is such that the counter 140 counts 255 pulses during the sampling interval, this being the maximum count capacity of an eight-bit binary counter. This fills the counter 140 and places all of its output lines at the binary one level. This condition is transferred to the memory 142, thus placing all of the output lines of memory 142 at the binary one level. This, in turn, activates all of the AND circuits 143–150. If now, during the next sampling interval, the repetition rate is still at this maximum value, then all of the zero-to-one transitions in the various stages of the counter 140 will be passed to the single-shot circuits 151–158. As a consequence, single-shot circuits 151–158, taken as a group, supply a total of 255 pulses to the OR circuit 159. This produces the same number of output pulses on the line 160 as there were input pulses. This is taken as the unity condition, the square of unity being unity.

Assume now that the input pulse repetition rate is one-half of the maximum rate. In this case, the counter 140 counts up to one-half of its maximum capacity, namely, up to 128. In this condition, only the most significant bit (MSB) line is at the binary one level, the others being at the zero level. This condition is transferred to the memory 142. As a consequence, the memory 142 activates only the AND circuit 143, the other AND circuits 144–150 being disabled. Since the least significant bit (LSB) stage of the counter 140 is connected to this AND circuit 143, the single-shot 151 will be triggered one-half as many times as there are pulses in the signal to the input of the counter 140 during the next sampling interval. Thus, a total of 64 pulses are produced on the output line 160. As a consequence, the output repetition rate is one-fourth of the maximum repetition rate. Since one-fourth is the square of one-half, the output repetition rate is the square of the input repetition rate where both are expressed as fractions of the maximum input repetition rate.

In a similar manner, it can be shown that if the input repetition rate is one-fourth of the maximum rate, then the output repetition rate becomes one-sixteenth of the maximum rate.

From the foregoing, it is seen that the squaring logic 132 operates on the zero-to-one portion of the square law curve. As a result, the absolute value of the repetition rate on the output line 160 will be equal to or less than the absolute value of the repetition rate at the input of the counter 140. Nevertheless, the pulse repetition rate on the output line 160 will vary as the square of the variation in the repetition rate at the input of the counter 140. In other words, if, for example, the repetition rate at the input of the counter 140 is doubled, the repetition rate on the output line 160 is quadrupled. For example, if the input repetition rate changes from one-half of the maximum value to the full maximum value, this represents a doubling of the input rate. For this same change, the output rate on line 160 changes from one-quarter of the maximum value to the full maximum value. This represents a fourfold change in the output repetition rate. Thus, the repetition rate at the output of the squaring logic 132 is caused to vary as the square of the variation in the amplitude of the original analog signal. This output repetition rate is, in fact, proportional to the square of the repetition rate at the input of the counter 140, bearing in mind that the proportionality constant is less than unity.

From the foregoing descriptions of FIGS. 1–5, it is seen that there is provided a digital readout system for use with mass spectrometers for producing simultaneous digital readouts of the maximum values of the ion current peaks and the mass number values for these peaks. This readout system is constructed to have a high degree of flexibility in its manner of operation so that it is readily capable of being used with a variety of different types of mass spectrometer instruments and under a variety of different instrument operating conditions. At the same time, the readout system is provided with various novel features for improving the accuracy and reliability of the digital data and for minimizing the possibility of producing erroneous or misleading entries in the sequence of output readings.

While there has been described what is at present considered to be a preferred embodiment of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A digital readout system for use with an analytical measuring instrument which produces a fluctuating measurement signal comprising:
    converter circuit means responsive to the measurement signal for producing a repetitive signal having a repetition rate dependent on the amplitude of the measurement signal;

counting circuit means responsive to the repetitive signal during periodic sampling intervals for developing digital signals dependent on the amplitude values of the measurement signal during the successive sampling intervals;

extreme value sensing circuit means responsive to the repetitive signal for transferring selected ones of the digital signals to output terminal means for the readout system;

said extreme value sensing circuit means comprising:

mode control circuit means for establishing peak sensing and valley sensing operating modes for the readout system;

circuit means responsive to the repetitive signal during the periodic sampling intervals for setting the mode control circuit means to the peak sensing mode when the measurement signal values begin to increase and for setting the mode control circuit means to the valley sensing mode when the measurement signal values begin to decrease; and circuit means responsive to the setting of the mode control circuit means for transferring selected ones of the digital signals to output terminal means for the readout system.

2. A digital readout system for use with an analytical measuring instrument which produces a fluctuating measurement signal comprising:

converter circuit means responsive to the measurement signal for producing a repetitive signal having a repetition rate dependent on the amplitude of the measurement signal;

counting circuit means responsive to the repetitive signal during periodic sampling intervals for developing digital signals dependent on the amplitude values of the measurement signal during the successive sampling intervals;

extreme value sensing circuit means responsive to the repetitive signal for transferring selected ones of the digital signals to output terminal means for the readout system;

said extreme value sensing circuit means operating to detect the occurrence of maxiumum values of peaks in the measurement signal and to transfer the digital signals representing these maximum values to the output terminal means, and circuit means operative at the beginning of each increasing fluctuation in the measurement signal and responsive to the repetitive signal during each sampling interval for disabling the transfer of digital signals to the output terminal means until the occurrence of a sampling interval which includes at least a predetermined number of repetitions of the repetitive signal, whereby the system is prevented from producing an output digital signal for an increasing fluctuation having less than a predetermined maximum value.

3. A digital readout system for use with an analytical measuring instrument which produces a fluctuating measurement signal comprising:

converter circuit means responsive to the measurement signal for producing a repetitive signal having a repetition rate dependent on the amplitude of the measurement signal;

counting circuit means responsive to the repetitive signal during periodic sampling intervals for developing digital signals dependent on the amplitude values of the measurement signal during the successive sampling intervals;

extreme value sensing circuit means responsive to the repetitive signal for transferring selected ones of the digital signals to output terminal means for the readout system;

said extreme value sensing circuit means operating to detect the occurrence of maximum values of peaks in the measurement signal and to transfer the digital signals representing these maximum values to the output terminal means;

timing circuit means for establishing the periodic sampling intervals; and circuit means coupled to the timing circuit means and operative at the beginning of each increasing fluctuation in the measurement signal for disabling the transfer of digital signals to the output terminal means until a predetermined minimum number of sampling intervals have occurred for each such increasing fluctuation, whereby the system is prevented from producing an output digital signal for an increasing fluctuation for which less than a predetermined number of sampling intervals have occurred.

4. A digital readout system for use with an analytical measuring instrument which produces a fluctuating measurement signal comprising:

converter circuit means responsive to the measurement signal for producing a repetitive signal having a repetition rate dependent on the amplitude of the measurement signal;

counting circuit means responsive to the repetitive signal during periodic sampling intervals for developing digital signals dependent on the amplitude values of the measurement signal during the successive sampling intervals;

extreme value sensing circuit means responsive to the repetitive signal for transferring selected ones of the digital signals to output terminal means for the readout system;

said extreme value sensing circuit means comprising:

memory circuit means for storing the most recent digital signal transferred thereto;

transfer circuit means for transferring a digital signal from the counting circuit means to the memory circuit means upon receipt of a transfer signal;

circuit means coupled to the memory circuit means and responsive to the repetitive signal during the sampling intervals for supplying to the transfer circuit means a transfer signal immediately following each sampling interval wherein the number of repetitive signal repetitions is greater than the number represented by the digital signal stored in the memory circuit means; and circuit means responsive to the repetitive signal during the sampling intervals for transferring the digital signal from the memory circuit means to the output terminal means for the readout system when the number of repetitive signal repetitions during a sampling interval becomes less than a predetermined fraction of the number represented by the digital signal stored in the memory circuit means, whereby the output terminal means is supplied with a digital signal representing the maximum value of a peak in the measurement signal.

5. A digital readout system for use with an analytical measuring instrument which produces a fluctuating measurement signal comprising:
- converter circuit means responsive to the measurement signal for producing a repetitive signal having a repetition rate dependent on the amplitude of the measurement signal;
- counting circuit means responsive to the repetitive signal during periodic sampling intervals for developing digital signals dependent on the amplitude values of the measurement signal during the successive sampling intervals;
- extreme value sensing circuit means responsive to the repetitive signal for transferring selected ones of the digital signals to output terminal means for the readout system;
- said extreme value sensing circuit means comprising:
- memory circuit means for storing the most recent digital signal transferred thereto;
- transfer circuit means for transferring a digital signal from the counting circuit means to the memory circuit means upon receipt of a transfer signal;
- circuit means coupled to the memory circuit means and responsive to the repetitive signal during the sampling intervals for supplying to the transfer circuit means a transfer signal immediately following each sampling interval wherein the number of repetitive signal repetitions is less than the number represented by the digital signal stored in the memory circuit means; and
- circuit means responsive to the repetitive signal during the sampling intervals for transferring the digital signal from the memory circuit means to the output terminal means for the readout system when the number of repetitive signal repetitions during a sampling interval exceeds by a predetermined fraction the number represented by the digital signal stored in the memory circuit means, whereby the output terminal means is supplied with a digital signal representing the minimum value of a valley in the measurement signal.

6. A digital readout system for use with an analytical measuring instrument which produces a fluctuating measurement signal comprising:
- converter circuit means responsive to the measurement signal for producing a repetitive signal having a repetition rate dependent on the amplitude of the measurement signal;
- counting circuit means responsive to the repetitive signal during periodic sampling intervals for developing digital signals dependent on the amplitude values of the measurement signal during the successive sampling intervals;
- extreme value sensing circuit means responsive to the repetitive signal for transferring selected ones of the digital signals to output terminal means for the readout system;
- said extreme value sensing circuit means comprising:
- memory circuit means for storing the most recent digital signal transferred thereto;
- transfer circuit means for transferring a digital signal from the counting circuit means to the memory circuit means upon receipt of a transfer signal;
- mode control circuit means for establishing peak sensing and valley sensing operating modes for the readout system;
- circuit means coupled to the memory circuit means and responsive to the repetitive signal during the sampling intervals and operative during the peak sensing mode for supplying to the transfer circuit means a transfer signal immediately following each sampling interval wherein the number of repetitive signal repetitions is greater than the number represented by the digital signal stored in the memory circuit means and operative during the valley sensing mode for supplying to the transfer circuit means a transfer signal immediately following each sampling interval, wherein the number of repetitive signal repetitions is less than the number represented by the digital signal stored in the memory circuit means; and
- circuit means responsive to the repetitive signal during the sampling intervals and operative during the peak sensing mode for transferring the digital signal from the memory circuit means to the output terminal means for the readout system and for switching the mode control circuit means to the valley sensing mode when the number of repetitive signal repetitions during a sampling interval becomes less than a predetermined fraction of the number represented by the digital signal stored in the memory circuit means and operative during the valley sensing mode for switching the mode control circuit means to the peak sensing mode when the number of repetitive signal repetitions during a sampling interval exceeds by a predetermined fraction the number represented by the digital signal stored in the memory circuit means.

7. A digital readout system for use with an analytical measuring instrument which produces a fluctuating measurement signal comprising:
- converter circuit means responsive to the measurement signal for producing a repetitive signal having a repetition rate dependent on the amplitude of the measurement signal;
- counting circuit means responsive to the repetitive signal during periodic sampling intervals for developing digital signals dependent on the amplitude values of the measurement signal during the successive sampling intervals;
- extreme value sensing circuit means responsive to the repetitive signal for transferring selected ones of the digital signals to output terminal means for the readout system;
- said extreme value sensing circuit means comprising:
- first memory circuit means for storing the most recent digital signal produced by the counting circuit means when the number represented by such signal is greater than the number represented by the signal previously stored in this first memory circuit means;
- rate multiplier circuit means responsive to the repetitive signal for producing a second repetitive signal having a repetition rate which is a predetermined fraction of the repetition rate of the first repetitive signal;
- second counting circuit means for counting the number of repetitions of the second repetitive signal occurring during the periodic sampling intervals for developing digital signals representing such numbers;
- second memory circuit means for storing the most recent digital signal produced by the second counting circuit means when the number represented by such signal is greater than the number represented by the signal previously stored in this second memory circuit means;

comparing circuit means coupled to the second memory circuit means and responsive to the first repetitive signal during the sampling intervals for producing a readout command signal when the number of repetitions of the first repetitive signal during a sampling interval becomes less than the number represented by the digital signal stored in the second memory circuit means; and circuit means responsive to the readout command signal for transferring the digital signal in the first memory circuit means to the output terminal means for the readout system.

8. A digital readout system for use with an analytical measuring instrument which produces a fluctuating measurement signal comprising:

converter circuit means responsive to the measurement signal for producing a repetitive signal having a repetition rate dependent on the amplitude of the measurement signal;

counting circuit means responsive to the repetitive signal during periodic sampling intervals for developing digital signals dependent on the amplitude values of the measurement signal during the successive sampling intervals;

extreme value sensing circuit means responsive to the repetitive signal for transferring selected ones of the digital signals to output terminal means for the readout system;

said extreme value sensing circuit means comprising:

memory circuit means for storing the most recent digital signal produced by the counting circuit means when the number represented by such signal is less than the number represented by the signal previously stored in this memory circuit means;

rate multiplier circuit means responsive to the repetitive signal for producing a second repetitive signal having a repetition rate which is a predetermined fraction of the repetition rate of the first repetitive signal;

comparing circuit means coupled to the memory circuit means and responsive to the second repetitive signal during the sampling intervals for producing a readout command signal when the number of repetitions of the second repetitive signal during a sampling interval becomes greater than the number represented by the digital signal stored in the memory circuit means; and circuit means responsive to the readout command signal for transferring the digital signal in the memory circuit means to the output terminal means for the readout system.

9. A digital readout system for use with an analytical measuring instrument which produces a fluctuating measurement signal comprising:

converter circuit means responsive to the measurement signal for producing a repetitive signal having a repetition rate dependent on the amplitude of the measurement signal;

counting circuit means responsive to the repetitive signal during periodic sampling intervals for developing digital signals dependent on the amplitude values of the measurement signal during the successive sampling intervals;

extreme value sensing circuit means responsive to the repetitive signal for transferring selected ones of the digital signals to output terminal means for the readout system;

said extreme value sensing circuit means comprising:

mode control circuit means for establishing peak sensing and valley sensing operating modes for the readout system and producing corresponding peak mode and valley mode control signals;

first memory circuit means operative during the peak sensing mode for storing the most recent digital signal produced by the counting circuit means when the number represented by such signal is greater than the number represented by the signal previously stored in this first memory circuit means and operative during the valley sensing mode for storing the most recent digital signal produced by the counting circuit means when the number represented by such signal is less than the number represented by the signal previously stored in this first memory circuit means;

rate multiplier circuit means responsive to the repetitive signal for producing a second repetitive signal having a repetition rate which is a predetermined fraction of the repetition rate of the first repetitive signal;

second counting circuit means for counting the numbers of repetitions of the second repetitive signal occurring during the periodic sampling intervals for developing digital signals representing such numbers;

second memory circuit means for storing the most recent digital signal produced by the second counting circuit means when the number represented by such signal is greater than the number represented by the signal previously stored in this second memory circuit means;

comparing circuit means responsive to the peak mode control signal for comparing the digital signal stored in the second memory circuit means with the number of repetitions of the first repetitive signal during the sampling intervals for switching the mode control circuit means to the valley sensing mode when the number of repetitions of the first repetitive signal during a sampling interval becomes less than the number represented by the digital signal stored in the second memory circuit means, and responsive to the valley mode control signal for comparing the digital signal stored in the first memory circuit means with the number of repetitions of the second repetitive signal during the sampling intervals for switching the mode control circuit means to the peak sensing mode when the number of repetitions of the second repetitive signal during a sampling interval becomes greater than the number represented by the digital signal stored in the first memory circuit means; and circuit means responsive to the switching of the mode control circuit means from the peak sensing mode to the valley sensing mode for transferring the digital signal in the first memory circuit means to the output terminal means for the readout system.

10. A digital readout system for use with an analytical measuring instrument which produces a fluctuating measurement signal comprising:

converter circuit means responsive to the measurement signal for producing a repetitive signal having a repetition rate dependent on the amplitude of the measurement signal;

counting circuit means responsive to the repetitive signal during periodic sampling intervals for developing digital signals dependent on the amplitude values of the measurement signal during the successive sampling intervals;

extreme value sensing circuit means responsive to the repetitive signal for transferring selected ones of the digital signals to output terminal means for the readout system;

said extreme value sensing circuit means comprising:

first memory circuit means for storing the most recent digital signal transferred thereto;

first transfer circuit means for transferring a digital signal from the counting circuit means to the first memory circuit means upon receipt of a transfer signal;

first comparing circuit means for comparing the digital signal stored in the first memory circuit means with the number of repetitions of the first repetitive signal during the sampling intervals for supplying to the first transfer circuit means a transfer signal immediately following each sampling interval wherein the number of repetitive signal repetitions is greater than the number represented by the digital signal stored in the first memory circuit means;

rate multiplier circuit means responsive to the repetitive signal for producing a second repetitive signal having a repetition rate which is a predetermined fraction of the repetition rate of the first repetitive signal;

second counting circuit means for counting the number of repetitions of the second repetitive signal occurring during the periodic sampling intervals for developing digital signals representing such numbers;

second memory circuit means for storing the most recent digital signal transferred thereto;

second transfer circuit means responsive to the transfer signals produced by the first comparing circuit means for transferring a digital signal from the second counting circuit means to the second memory circuit means upon the occurrence of such a transfer signal;

second comparing circuit means for comparing the digital signal stored in the second memory circuit means with the number of repetitions of the first repetitive signal during the sampling intervals for producing a readout command signal when the number of repetitions of the first repetitive signal during a sampling interval becomes less than the number represented by the digital signal stored in the second memory circuit means; and circuit means responsive to the readout command signal for transferring the digital signal in the first memory circuit means to the output terminal means for the readout system.

11. A digital readout system for use with an analytical measuring instrument which produces a fluctuating measurement signal comprising:

converter circuit means responsive to the measurement signal for producing a repetitive signal having a repetition rate dependent on the amplitude of the measurement signal;

counting circuit means responsive to the repetitive signal during periodic sampling intervals for developing digital signals dependent on the amplitude values of the measurement signal during the successive sampling intervals;

extreme value sensing circuit means responsive to the repetitive signal for transferring selected ones of the digital signals to output terminal means for the readout system;

said extreme value sensing circuit means comprising:

memory circuit means for storing the most recent digital signal transferred thereto;

transfer circuit means for transferring a digital signal from the counting circuit means to the memory circuit means upon receipt of a transfer signal;

first comparing circuit means for comparing the digital signal stored in the memory circuit means with the number of repetitions of the first repetitive signal during the sampling intervals for supplying to the transfer circuit means a transfer signal immediately following each sampling interval wherein the number of repetitive signal repetitions is less than the number represented by the digital signal stored in the memory circuit means;

rate multiplier circuit means responsive to the repetitive signal for producing a second repetitive signal having a repetition rate which is a predetermined fraction of the repetition rate of the first repetitive signal;

second comparing circuit means for comparing the digital signal stored in the memory circuit means with the number of repetitions of the second repetitive signal during the sampling intervals for producing a readout command signal when the number of repetitions of the second repetitive signal during a sampling interval becomes greater than the number represented by the digital signal stored in the memory circuit means; and circuit means responsive to the readout command signal for transferring the digital signal in the memory circuit means to the output terminal means for the readout system.

12. A digital readout system for use with an analytical measuring instrument which produces a fluctuating measurement signal comprising:

converter circuit means responsive to the measurement signal for producing a repetitive signal having a repetition rate dependent on the amplitude of the measurement signal;

counting circuit means responsive to the repetitive signal during periodic sampling intervals for developing digital signals dependent on the amplitude values of the measurement signal during the successive sampling intervals;

extreme value sensing circuit means responsive to the repetitive signal for transferring selected ones of the digital signals to output terminal means for the readout system;

said extreme value sensing circuit means comprising:

mode control circuit means for establishing peak sensing and valley sensing operating modes for the readout system and for producing peak mode and valley mode control signals during the occurrence of these respective operating modes;

first memory circuit means for storing the most recent digital signal transferred thereto;

first transfer circuit means for transferring a digital signal from the counting circuit means to the first memory circuit means upon receipt of a transfer signal;

first comparing circuit means for comparing the digital signal stored in the first memory circuit means with the number of repetitions of the first repetitive signal during the sampling intervals and responsive to the peak mode control signal for producing a transfer signal and supplying same to the first transfer circuit means immediately following each sampling interval, wherein the number of repetitive signal repetitions is greater than the number represented by the digital signal stored in the first memory circuit means, and responsive to the valley mode control signal for producing a transfer signal and supplying same to the first transfer circuit means immediately following each sampling interval, wherein the number of repetitive signal repetitions is less than the number represented by the digital signal stored in the first memory circuit means;

rate multiplier circuit means responsive to the repetitive signal for producing a second repetitive signal having a repetition rate which is a predetermined fraction of the repetition rate of the first repetitive signal;

second counting circuit means for counting the number of repetitions of the second repetitive signal occurring during the periodic sampling intervals for developing digital signals representing such numbers;

second memory circuit means for storing the most recent digital signal transferred thereto;

second transfer circuit means responsive to the transfer signals produced by the first comparing circuit means for transferring a digital signal from the second counting circuit means to the second memory circuit means upon the occurrence of such a transfer signal;

second comparing circuit means responsive to the peak mode control signal for comparing the digital signal stored in the second memory circuit means with the number of repetitions of the first repetitive signal during the sampling intervals for switching the mode control circuit means to the valley sensing operating mode when the number of repetitions of the first repetitive signal during a sampling interval becomes less than the number represented by the digital signal stored in the second memory circuit means, and responsive to the valley mode control signal for comparing the digital signal stored in the first memory circuit means with the number of repetitions of the second repetitive signal during the sampling intervals for switching the mode control circuit means to the peak sensing operating mode when the number of repetitions of the second repetitive signal during a sampling interval becomes greater than the number represented by the digital signal stored in the first memory circuit means; and circuit means responsive to the switching of the mode control circuit means from the peak sensing mode to the valley sensing mode for transferring the digital signal in the first memory circuit means to the output terminal means for the readout system.

13. A digital readout system for use with an analytical measuring instrument wherein a sample being analyzed is subjected to a varying control effect and wherein the analytical measuring instrument produces a fluctuating measurement signal and a control effect signal representing the control effect variation comprising:

first converter circuit means responsive to the measurement signal for producing a first repetitive signal having a repetition rate dependent on the amplitude of the measurement signal;

second converter circuit means responsive to the control effect signal for producing a second repetitive signal having a repetition rate dependent on the amplitude of the control effect signal;

circuit means responsive to the second repetitive signal during periodic sampling intervals for developing digital signals dependent on the amplitude values of the control effect signal during the successive sampling intervals;

extreme value sensing circuit means responsive to the first repetitive signal for transferring selected ones of the digital signals to output terminal means for the readout system;

said circuit means for developing digital signals comprising:

timing circuit means for supplying timing signals at a constant rate;

counting circuit means for counting the timing signals;

computing circuit means responsive to the second repetitive signal during the periodic sampling intervals for developing gating signals having durations which are inversely proportional to the number of the second repetitive signal repetitions during the respective sampling intervals; and gating circuit means responsive to the gating signals for controlling the flow of timing signals from the timing circuit means to the counting circuit means for causing the counting circuit means to develop digital signals representing numbers which are inversely proportional to the amplitude values of the control effect signal during the different sampling intervals.

14. A digital readout system for use with an analytical measuring instrument wherein a sample being analyzed is subjected to a varying control effect and wherein the analytical measuring instrument produces a fluctuating measurement signal and a control effect signal representing the control effect variation comprising:

first converter circuit means responsive to the measurement signal for producing a first repetitive signal having a repetition rate dependent on the amplitude of the measurement signal;

second converter circuit means responsive to the control effect signal for producing a second repetitive signal having a repetition rate dependent on the amplitude of the control effect signal;

circuit means responsive to the second repetitive signal during periodic sampling intervals for developing digital signals dependent on the amplitude values of the control effect signal during the successive sampling intervals;

extreme value sensing circuit means responsive to the first repetitive signal for transferring selected ones of the digital signals to output terminal means for the readout system;

said circuit means for developing digital signals comprising:

squaring circuit means responsive to the second repetitive signal during the sampling intervals for producing a third repetitive signal having a repetition rate proportional to the square of the amplitude of the control effect signal; and counting circuit means for counting the number of repetitions of the third repetitive signal during the sampling intervals for develoing digital signals representing numbers proportional to the square of the amplitude values of the control effect signal during the different sampling intervals.

15. A digital readout system for use with an analytical measuring instrument wherein a sample being analyzed is subjected to a varying control effect and wherein the analytical measuring instrument produces a fluctuating measurement signal and a control effect signal representing the control effect variation comprising:

first converter circuit means responsive to the measurement signal for producing a first repetitive signal having a repetition rate dependent on the amplitude of the measurement signal;

second converter circuit means responsive to the control effect signal for producing a second repetitive signal having a repetition rate dependent on the amplitude of the control effect signal;

circuit means responsive to the second repetitive signal during periodic sampling intervals for developing digital signals dependent on the amplitude values of the control effect signal during the successive sampling intervals;

extreme value sensing circuit means responsive to the first repetitive signal for transferring selected ones of the digital signals to output terminal means for the readout system;

said circuit means for developing digital signals comprising:

timing circuit means for supplying a repetitive timing signal having a constant repetition rate;

counting circuit means for counting the number of repetitions of the second repetitive signal occurring during the periodic sampling intervals for developing digital signals representing such numbers;

computing circuit means responsive to the second repetitive signal during the periodic sampling intervals for developing gating signals having durations which are inversely proportional to the number of repetitive signal repetitions during the responsive sampling intervals;

gating circuit means having an input and an output and being responsive to the gating signals developed by the computing circuit means for allowing passage of a signal from its input to its output only during the occurence of such gating signals;

squaring circuit means responsive to the second repetitive signal during the sampling intervals for producing a third repetitive signal having a repetition rate proportional to the square of the amplitude of the control effect signal; and switch means having:

a first setting for coupling the counting circuit means to the output of the second converter circuit means for developing digital signals representing numbers proportional to the amplitude values of the control effect signal during the different sampling intervals, a second setting for coupling the output of the timing circuit means to the input of the gating circuit means and for coupling the output of the gating circuit means to the input of the counting circuit means and for coupling the input of the computing circuit means to the output of the second converter circuit means for developing digital signals representing the numbers inversely proportional to the amplitude values of the control effect signal during the different sampling intervals, and a third setting for coupling the input of the squaring circuit means to the output of the second converter circuit means and for coupling the output of the squaring circuit means to the input of the counting circuit means for developing digital signals representing numbers proportional to the square of the amplitude values of the control effect signal during the different sampling intervals.

16. A digital readout system for use with an analytical measuring instrument wherein a sample being analyzed is subjected to a pair of variable control effects and wherein the analytical measuring instrument produces a fluctuating measurement signal and first and secon control effect signals representing the magnitudes of the pair of control effects comprising:

first and second converter circuit means responsive to the first and second control effect signals, respectively, for producing first and second repetitive signals having repetition rates dependent on the amplitudes of the respective first and second control effect signals;

circuit means responsive to both of the repetitives signals during periodic sampling intervals for developing digital signals representing numbers proportional to the values of the ration of the square of the second control effect signal to the first control effect signal during the successive sampling intervals;

fourth signal converter circuit means responsive to the measurement signal for producing a fourth repetitive signal having a repetition rate dependent on the amplitude of the measurement signal;

extreme value sensing circuit means responsive to the fourth repetitive signal for transferring selected ones of the digital signals to output terminal means for the readout system;

said circuit means for developing digital signals comprising:

squaring circuit means responsive to the second repetitive signal during the sampling intervals for producing a third repetitive signal having a repetition rate proportional to the square of the amplitude of the second control effect signal;

counting circuit means for counting the repetitions of the third repetitive signal;

computing circuit means responsive to the first repetitive signal during the sampling intervals for developing gating signals having durations which are inversely proportional to the number of repetitions of the first repetitive signal during the respective sampling intervals; and gating circuit means responsive to the gating signals developed by the computing circuit means for controlling the flow of the third repetitive signal from the squaring circuit means to the counting circuit means for causing the counting circuit means to develop digital signals representing numbers proportional to the values of the ratio of the square of the second control effect signal to the first control ffect signal during the successive sampling intervals.

17. A digital readout system for use with an analytical measuring instrument wherein a sample being analyzed is subjected to a pair of variable control effects and wherein the analytical measuring instrument produces a fluctuating measurement signal and first and second control effect signals representing the magnitudes of the pair of control effects comprising:

first and second converter circuit means responsive to the first and second control effect signals, respectively, for producing first and second repetitive signals having repetition rates dependent on the amplitudes of the respective first and second control effect signals;

circuit means responsive to both of the repetitive signals during periodic sampling intervals for developing digital signals representing numbers proportional to the values of the ratio of the square of the second control effect signal to the first control effect signal during the successive sampling intervals;

fourth signal converter circuit means responsive to the measurement signal for producing a fourth repetitive signal having a repetition rate dependent on the amplitude of the measurement signal;

exteme value sensing circuit means responsive to the fourth repetitive signal for transferring selected ones of the digital signals to output terminal means for the readout system;

said circuit means for developing digital signals comprising:

timing circuit means for supplying a repetitive timing signal having a constant repetition rate;

counting circuit means for counting the number of repetitions of a repetitive signal occurring during the periodice sampling intervals for developing digital signals representing such nubmers;

computing circuit means responsive to a repetitive signal during the periodic sampling intervals for developing gating signals having durations which are inversely proportional to the number of repetitions of the received repetitive signal during the respective sampling intervals;

gating circuit means having an input and an output and responsive to the gating signals developed by the computing circuit means for allowing passage of a signal from its input to its output only during the occurrence of such gating signals;

squaring circuit means responsive to a repetitive signal during the sampling intervals for producing a repetitive signal having a repetition rate which varies as the square of the variation of the repetition rate of the received repetitive signal; and switch means having:

a first setting for coupling the counting circuit means to the first converter circuit means for counting the repetitions of the first repetitive signal during each sampling interval for developing digital signals representing numbers proportional to the amplitude values of the first control effect signal during the different sampling intervals, a second setting for coupling the counting circuit means to the second converter circuit means for counting the repetitions of the second repetitive signal during each sampling interval for developing digital signals representing numbers proportional to the amplitude values of the second control effect signal during the different sampling intervals, a third setting for coupling the input of the gating circuit means to the output of the timing circuit means, for coupling the output of the gating circuit means to the input of the counting circuit means, for coupling the input of the counting circuit means, and for coupling the input of the computing circuit means to the output of the first converter circuit means for causing the counting circuit means to develop digital signals representing numbers which are inversely proportional to the amplitude values of the first control effect signal during the different sampling intervals, a fourth setting for coupling the input of the squaring circuit means to the output of the second converter circuit means, and for coupling the output of the squaring circuit means to the input of the counting circuit means for causing the counting circuit means to develop digital signals representing numbers which are porportional to the square of the amplitude values of the second control effect signal during the different sampling intervals, and a fifth setting for coupling the input of the squaring circuit means to the output of the second converter circuit means, for coupling the output of the squaring circuit means to the input of the gating circuit means, for coupling the output of the gating circuit means to the input of the counting circuit means, and for coupling the input of the computing circuit means to the output of the first converter circuit means for causing the counting circuit means to develop digital signals representing numbers proportional to the values of the ratio of square of the second control effect signal to the first control effect signal during the different sampling intervals.

18. A digital readout system for use with an analytical measuring instrument wherein a sample being analyzed is subjected to a varying control effect and wherein the analytical measuring instrument produces a fluctuating measurement signal and a control effect signal representing the control effect variation comprising:

first converter circuit means responsive to the measurement signal for producing a first repetitive signal having a repetition rate dependent on the amplitude of the measurement signal;

second converter circuit means responsive to the control effect signal for producing a second repetitive signal having a repetition rate dependent on the amplitude of the control effect signal;

counting circuit means responsive to the first repetitive signal during periodic sampling intervals for developing first digital signals dependent on the amplitude values of the measurement signal during the successive sampling intervals;

circuit means responsive to the second repetitive signal during the sampling intervals for developing second digital signals dependent on the amplitude values of the control effect signal during the successive sampling intervals;

extreme value sensing circuit means responsive to the first repetitive signal for transferring selected ones of the first and second digital signals to output terminal means for the readout system;

said extreme value sensing circuit means operating to detect the occurence of maximum values of peaks in the measurement signal and to transfer the first and second digital signals existing at the occurence of these maximum values to the output terminal means; and circuit means operative at the begining of each increasing fluctuation in the measurement signal and responsive to the first repetitive signal during each sampling interval for disabling the transfer of first and second digitial signals to the output terminal means until the occurrence of a sampling interval which includes at least a predetermined number of repetitions of the first repetitive signal, whereby the system is prevented from producing output digital signals for an increasing fluctuation having less than a predetermined maximum value.

19. A digital readout system for use with an analytical measuring instrument wherein a sample being analyzed is subjected to a varying control effect and wherein the analytical measuring instrument produces a fluctuating measurement signal and a control effect signal representing the control effect variation comprising:

first converter circuit means responsive to the measurement signal for producing a first repetitive signal having a repetition rate dependent on the amplitude of the measurement signal;

second converter circuit means responsive to the control effect signal for producing a second repetitive signal having a repetition rate dependent on the amplitude of the control effect signal;

counting circuit means responsive to the first repetitive signal during periodic sampling intervals for developing first digital signals dependent on the amplitude values of the measurement signal during the successive sampling intervals;

circuit means responsive to the second repetitive signal during the sampling intervals for developing second digital signals dependent on the amplitude values of the control effect signal during the successive sampling intervals;

extreme value sensing circuit means responsive to the first repetitive signal for transferring selected ones of the first and second digital signals to output terminal means for the readout system;

said extreme value sensing circuit means operating to detect the occurrence of maximum values of peaks in the measurement signal and to transfer the first and second digital signals existing at the occurrence of these maximum values to the output terminal means;

timing circuit means for establishing the periodic sampling intervals; and circuit means coupled to the timing circuit means and operative at the beginning of each increasing fluctuation in the measurement signal for disabling the transfer of first and second digital signals to the output terminal means until a predetermined minimum number of sampling intervals have occurred for each such increasing fluctuation, whereby the system is prevented from producing output digital signals for an increasing fluctuation for which less than a predetermined number of sampling intervals have occurred.

20. A digital readout system for use with an analytical measuring instrument wherein a sample being analyzed is subjected to a varying control effect and wherein the analytical measuring instrument produces a fluctuating measurement signal and a control effect signal representing the control effect variation comprising:

first converter circuit means responsive to the measurement signal for producing a first repetitive signal having a repetition rate dependent on the amplitude of the measurement signal;

second converter circuit means responsive to the control effect signal for producing a second repetitive signal having a repetition rate dependent on the amplitude of the control effect signal;

counting circuit means responsive to the first repetitive signal during periodic sampling intervals for developing first digital signals dependent on the amplitude values of the measurement signal during the successive sampling intervals;

circuit means responsive to the second repetitive signal during the sampling intervals for developing second digital signals dependent on the amplitude values of the control effect signal during the successive sampling intervals;

extreme value sensing circuit means responsive to the first repetitive signal for transferring selected ones of the first and second digital signals to output terminal means for the readout system;

said circuit means responsive to the second repetitive signal for developing second digital signals comprising:

timing circuit means for supplying timing signals at a constant rate;

counting circuit means for counting these timing signals;

computing circuit means responsive to the second repetitive signal during the periodic sampling intervals for developing gating signals having duration which are inversely proportional to the numbers of repetitions of the second repetitive signal during the respective sampling intervals; and gating circuit means responsive to the gating signals developed by the computing circuit means for controlling the flow of timing signals from the timing circuit means to the counting circuit means for causing the counting circuit means to develop second digital signals representing numbers which are inversely proportional to the amplitude values of the control effect signal during the different sampling intervals.

21. A digital readout system for use with an analytical measuring instrument wherein a sample being analyzed is subjected to a varying control effect and wherein the analytical measuring instrument produces a fluctuating measurement signal and a control effect signal representing the control effect variation comprising:

first converter circuit means responsive to the measurement signal for producing a first repetitive signal having a repetition rate dependent on the amplitude of the measurement signal;

second converter circuit means resonsive to the control effect signal for producing a second repetitive signal having a repetition rate dependent on the amplitude of the control effect signal;

counting circuit means responsive to the first repetitive signal during periodic sampling intervals for developing first digital signals dependent on the amplitude values of the measurement signal during the successive sampling intervals;

circuit means responsive to the second repetitive signal during the sampling intervals for developing second digital signals dependent on the amplitude values of the control effect signal during the successive sampling intervals;

extreme value sensing circuit means responsive to the first repetitive signal for transferring selected ones of the first and second digital signals to output terminal means for the readout system;

said circuit means responsive to the second comprising: repetitive signal for developing second digital signals comprising:

squaring circuit means responsive to the second repetitive signal during the sampling intervals for producing a third repetitive signal having a repetition rate which varies as the square of the variation of the repetition rate of the second repetitive signal; and counting circuit means for counting the numbers of repetitions of the third repetitive signal during the sampling intervals for developing second digital signals representing numbers proportional to the square of the amplitude values of the control effect signal during the different sampling intervals.

* * * * *

PO-1050
(5/69)

UNITED STATES PATENT OFFICE
CERTIFICATE OF CORRECTION

Patent No. 3,733,601            Dated May 15, 1973

Inventor(s) Donald L. Oliver

It is certified that error appears in the above-identified patent and that said Letters Patent are hereby corrected as shown below:

Col. 4, line 24, before isotope change "of" to --or--.
Col. 4, line 26, after values change "is" to --in--.
Col. 5, line 12, before "23" change "ling" to --line--.
Col. 5, line 14, delete "control effect".
Col. _, line 27, before "generated" delete --detected--.
Col. 7, delete lines 33 thru 36.
Col. 8, line 36, before "counter" insert --up--.
Col. 10, line 10, change "bacause" to --because--.
Col. 12, line 44, change "with" to --With--.
Col. 15, line 61, change "draings" to --drawings--.
Col. 38, line 21, change "secon" to --second--.
Col. 38, line 31, change "repetitives" to --repetitive--.
Col. 38, line 34, change "ration" to --ratio--.
Col. 39, line 1, change "ffect" to --effect--.
Col. 39, line 37, change "nubmers" to --numbers--.
Col. 40, line 37, before "square" insert --the--.

Signed and sealed this 18th day of September 1973.

(SEAL)
Attest:

EDWARD M. FLETCHER, JR.
Attesting Officer

RENE D. TEGTMEYER
Acting Commissioner of Patents